(12) United States Patent
Koshiba

(10) Patent No.: US 7,257,224 B2
(45) Date of Patent: Aug. 14, 2007

(54) CRYPTOGRAPHICAL PSEUDO-RANDOM NUMBER GENERATION APPARATUS AND PROGRAM

(75) Inventor: Takeshi Koshiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 945 days.

(21) Appl. No.: 10/610,536

(22) Filed: Jul. 2, 2003

(65) Prior Publication Data

US 2004/0005053 A1 Jan. 8, 2004

(30) Foreign Application Priority Data

Jul. 5, 2002 (JP) ............................. 2002-197617

(51) Int. Cl.
*H04K 1/00* (2006.01)
*H04L 9/00* (2006.01)
*H04L 9/28* (2006.01)

(52) U.S. Cl. .............................. 380/28; 380/46; 380/37
(58) Field of Classification Search .................. 380/28, 380/37, 46
See application file for complete search history.

(56) References Cited

U.S. PATENT DOCUMENTS 5,412,729 A * 5/1995 Liu ............................. 380/37
6,097,815 A * 8/2000 Shimada ...................... 380/46

\* cited by examiner

*Primary Examiner*—Kambiz Zand
*Assistant Examiner*—Jason K. Gee
(74) *Attorney, Agent, or Firm*—Staas & Halsey LLP

(57) ABSTRACT

Natural numbers c, o, and a, and p-bit bit strings w1 and w2 are inputted. w1 and w2 are stored in an internal status storage unit and a generator storage unit respectively. The value g of p bits stored in the internal status storage unit is defined as a generator. The value of high order bits of the p bits stored in the internal status storage unit is defined as s. Then, $g^s$ represented by p bits is calculated, stored in the internal status storage unit, and high order o bits of the stored p bits are output. The series of processes are repeated a times, and a pseudo-random numbers are generated. Thus, pseudo-random numbers whose security has been mathematically guaranteed can be quickly generated.

15 Claims, 13 Drawing Sheets

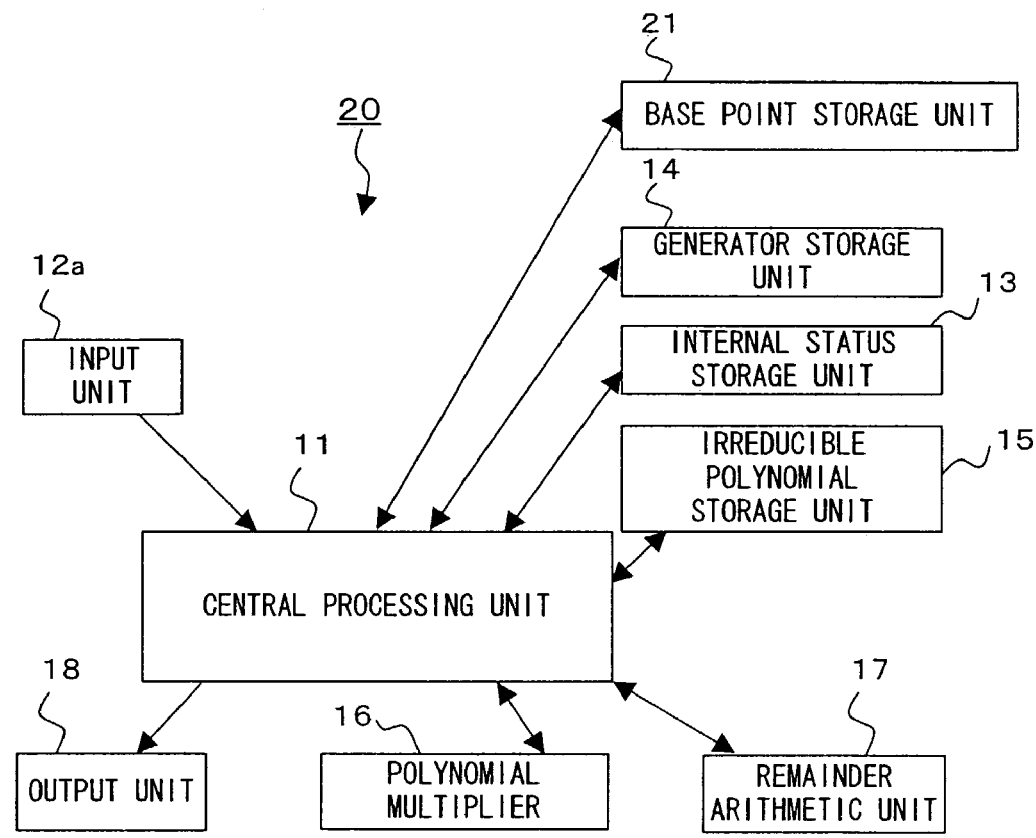
F I G. 3

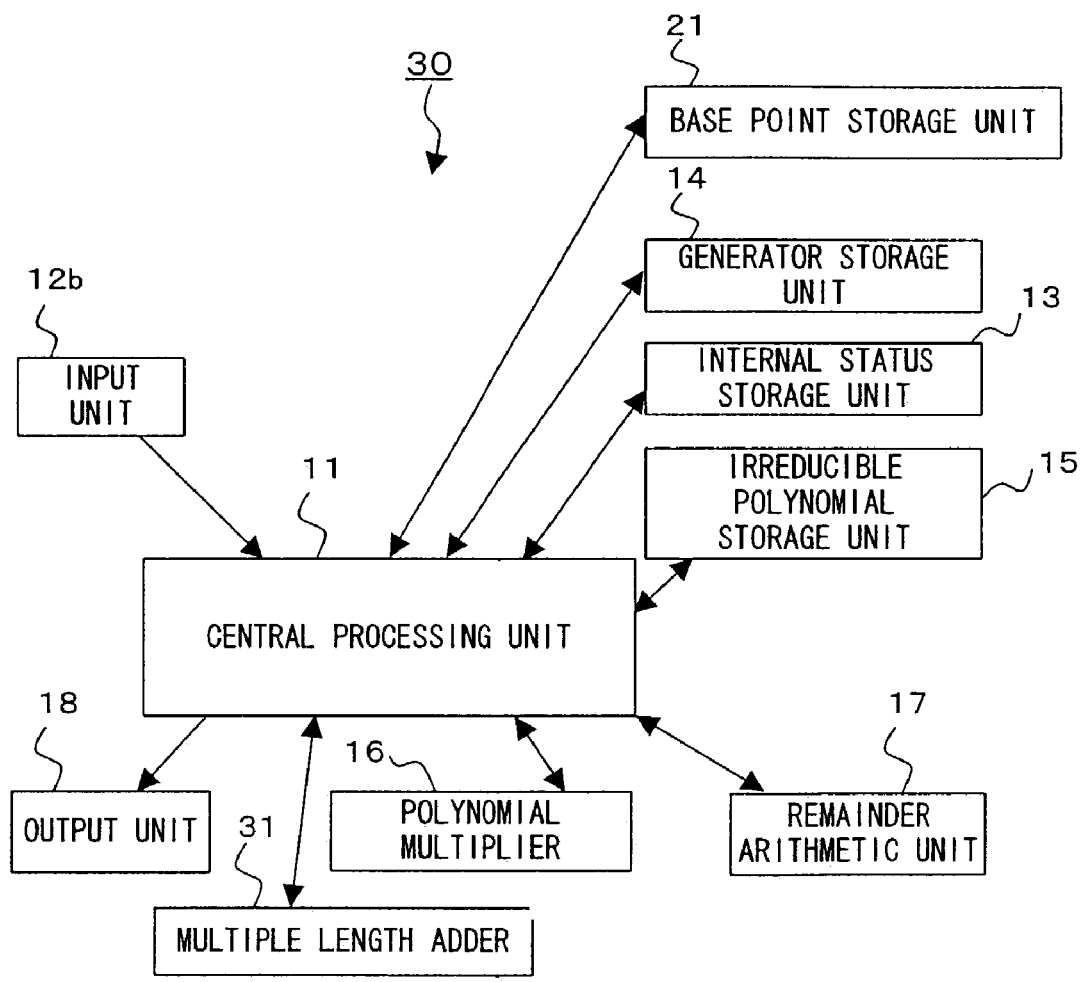
F I G. 5

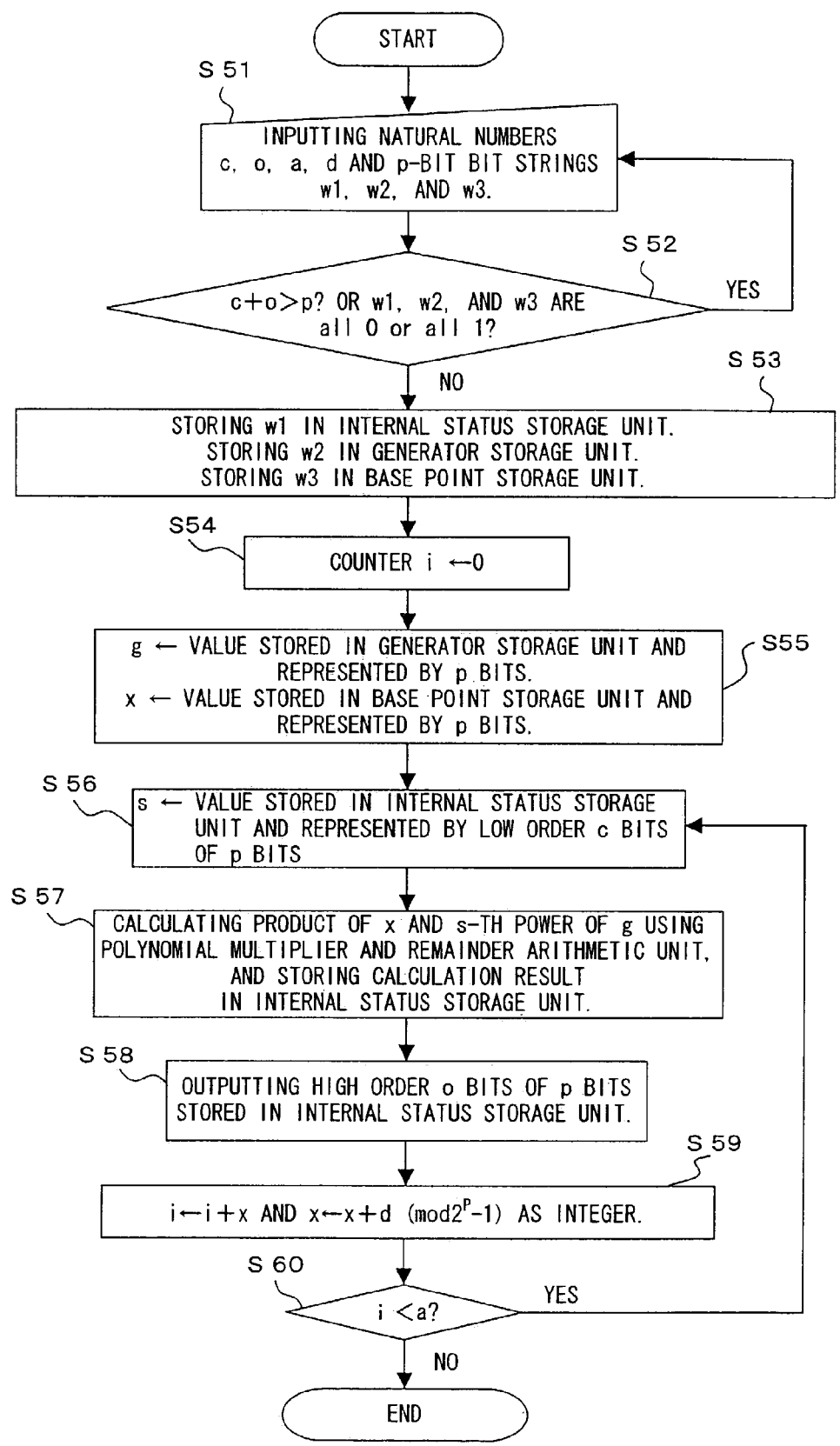
F I G. 6

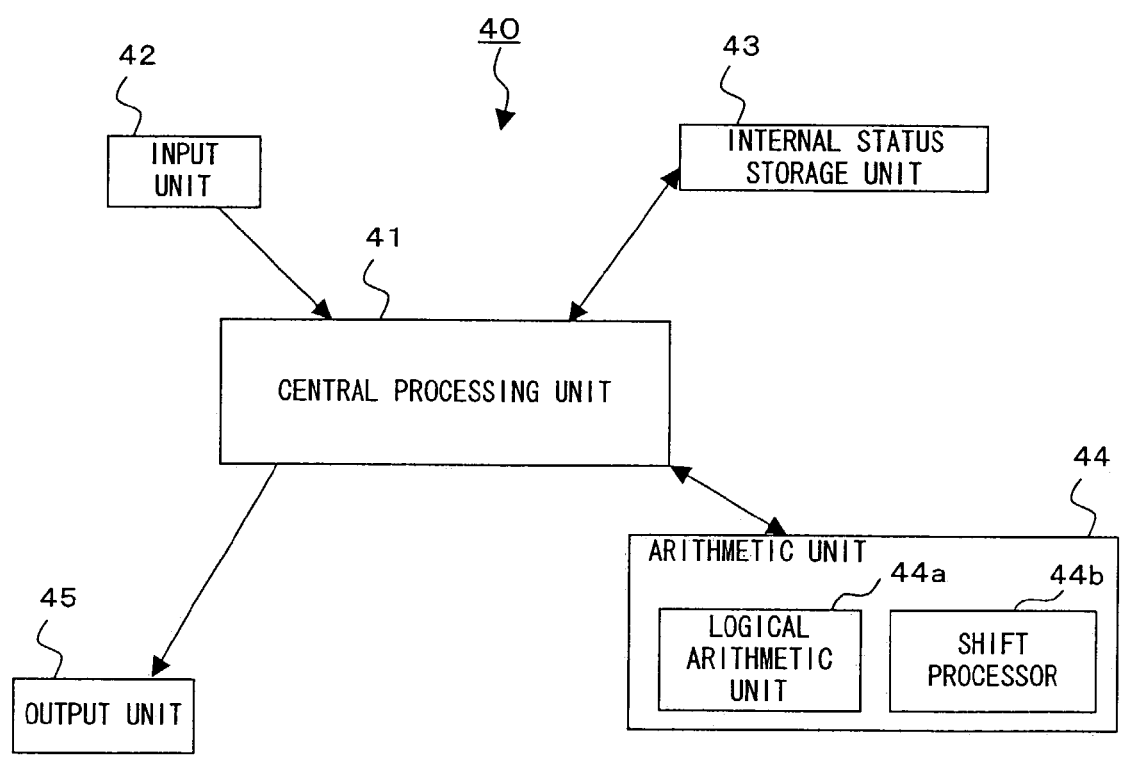
F I G. 7

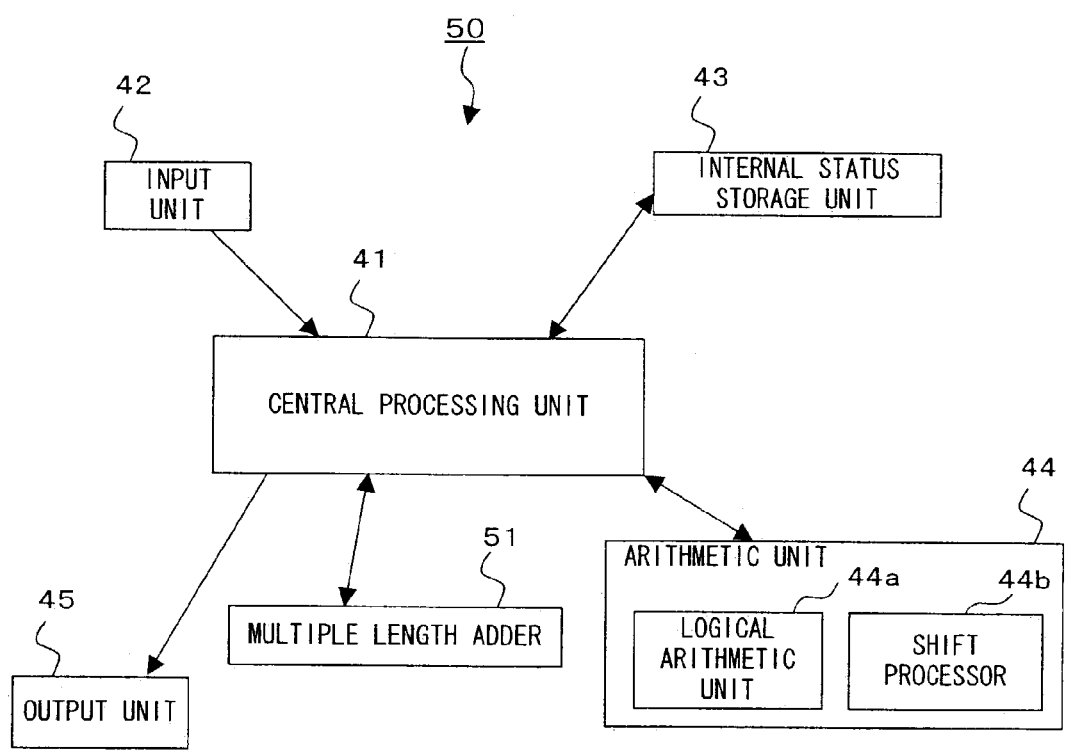
F I G. 9

CRYPTOGRAPHICAL PSEUDO-RANDOM NUMBER GENERATION APPARATUS AND PROGRAM

BACKGROUND OF THE INVENTION

1. Field of the Invention

The present invention relates to an apparatus and program for generating arithmetic containing a pseudo-random number required in a cryptosystem.

2. Description of the Related Art

An electronic community is being realized with the development of information technology including the Electronic Signature Law, the IT Document Batch Processing Law, etc. which have come into effect since 2001, online shopping through electronic mail, Internet, etc.

One of the key technologies of the electronic community can be arithmetic containing a cryptographical technology. In the electronic community, since important contents such as electronic documents, etc. are communicated through a network, the security technology for avoiding tapping and falsification is required. The indispensable technology for the security technology is a cryptographical technology, and generating a random number is very important step in the cryptographical technology.

A random number is a value obtained either completely at random or according to a predetermined rule, and generating such a value is called random number generation. The random number generation is an indispensable element in the recent security technology as one of the important constituent technologies for supporting the PKI (public key infrastructure). A random number can be an intrinsic random number or a pseudo-random number.

An intrinsic random number is a random number string which is arrayed completely at random and has nocycle. It is very difficult to use it as cryptograph, and there is a problem of efficiency in storing and transferring a long random number string. A pseudo-random number is a sequence which is hardly discriminated from an intrinsic random number generated using a predetermined arithmetic equation, etc., and it is practically useful to use a pseudo-random number instead of an intrinsic random number.

In a system in which the above mentioned pseudo-random number is used in various application fields, the security of the pseudo-random number affects the security of the system, and the generation efficiency of the pseudo-random number affects the speed of the entire system. Therefore, a pseudo-random number requires security and generation efficiency. Generally, a conventional pseudo-random number generation system seems to be secure, but the security is not clearly defined for the system, and most of these systems have only passed some statistical tests. On the other hand, a "cryptographical pseudo-random number" is defined to pass any polynomial time statistical test. That is, a "cryptographical pseudo-random number generating method" refers to a pseudo-random number generating method whose security is mathematically proved. However, there are no unconditional "cryptographical pseudo-random number generating methods", and a type of assumption in calculation amount logic (normally considered to be reasonable) is defined.

The following methods are known as typical security provable pseudo-random number generating methods. In the following methods, k indicates the number of bits of q or N, and is normally called a security parameter.

BBS: The i-th internal status is represented by $s_i = (s_{i-1})^2 \bmod N$ (N indicates the Blum number), and the i-th output is the low order bits O (log k) of $s_i$. The security refers to the difficulty of the problem of factoring into prime components of the Blum number N.

BM: The i-th internal status is represented by $s_i = g^{s_{i-1}} \bmod q$ (q indicates a prime number), and the i-th output is the high order bits O (log k) of $s_i$. g indicates a generator. The security refers to the difficulty of the problem of discrete logarithm.

The conventional pseudo-random number generation system is generally quick in operation, but lacks mathematic grounds for security, and has therefore been uncertain in security. On the other hand, the conventional cryptographical pseudo-random number generating system (BBS system and BM system) has mathematical assurance in security, but has a problem in arithmetic speed.

In the BBS system, about log k bits can be output in one multiplication. In the BM system, about k multiplications are required for one arithmetic operation containing a power, and can output k−ω (log k) bits (ω indicates the order of a function truly larger than log k, and smaller than k). Assuming that k=approximately 1000 is selected as a realistic security parameter, about 10 bits can be output in one multiplication in the BBS system, and about one bit can be output in one multiplication in the BM system.

SUMMARY OF THE INVENTION

The present invention aims at realizing an apparatus and a program capable of providing mathematical assurance in security, and generating a cryptographical pseudo-random number more quickly than the conventional cryptographical pseudo-random number generating system.

The cryptographical pseudo-random number generation apparatus and program according to the first mode of the present invention is based on the calculation by a word length of w bits. Then, natural numbers c, o, and a (c+o≦p where p indicates a prime number, and $2^p-1$ also indicates a prime number) and at least two bit strings (on condition that each of the bit strings includes a bit of 0 and a bit of 1) of a bit length p, and the first bit string of the bit length p are stored in an internal status storage unit, the second bit string of the input bit length p is stored in a generator storage unit, the irreducible polynomial f (t) ($=t^p + b_{p-1}t^{p-1} + b_{p-2}t^{p-2} + \ldots + b_1 t + b_0$) of {0, 1} coefficient is stored in an irreducible polynomial storage unit depending on the bit string of {0, 1} coefficient $b_{p-1} b_{p-2} \ldots b_1 b_0$, $g^s$ (modf(t)) is computed using the value g of p bits stored in the generator storage unit, the value s of the low order c bits of the p bits stored in the internal status storage unit, and the bit string of the p bits stored in the irreducible polynomial storage unit, the arithmetic result of the p bits of the arithmetic unit is stored in the internal status storage unit, and the low order o bits of the arithmetic result of the p bits are output. The above mentioned series of processes are repeated a times, thereby generating a pseudo-random number.

The cryptographical pseudo-random number generation apparatus and program according to the second mode of the present invention is based on the calculation by a word length of w bits. Then, natural numbers $c_1, c_2, \ldots, c_u, o_1, o_2, \ldots, o_v$, a (u+v≦p (p indicates a prime number, and $2^p-1$ also indicates a prime number) and $c_i \leq p$, $o_i \leq p$, and $c_i \neq o_j$ for all i's) and the bit string of the bit length p (on condition that each of the bit strings includes a bit of 0 and a bit of 1) are input, the input bit string of the bit length p is stored in the internal status storage unit, $f^s(x)$ is computed by performing the operation f including the logical operation and the shifting operation on the value x of the bit string of the bit length p stored in the internal status storage unit for the number of times of the value s of the bit string prescribed by $c_1, c_2, \ldots, c_u$ bits of the bit string of the bit length p stored in the internal status storage unit, the calculation result represented by p bits is stored in the internal status storage unit, and $o_1, o_2, \ldots o_v$ bits of the calculation result of the bit string of the p bits are output. The above mentioned series of processes are repeated a times, thereby generating a pseudo-random number.

In the above mentioned present invention, a larger number of bits can be output in one multiplication than in the conventional system. Therefore, a pseudo-random number can be generated more quickly than in the conventional technology. Furthermore, a generated pseudo-random number is a cryptographical pseudo-random number with high security having mathematically assured security.

BRIEF DESCRIPTION OF THE DRAWINGS

FIG. 3 is a block diagram of the system configuration of the cryptographical pseudo-random number generation apparatus according to the second embodiment of the present invention;

FIG. 5 is a block diagram of the system configuration of the cryptographical pseudo-random number generation apparatus according to the third embodiment of the present invention;

FIG. 6 is a flowchart for explanation of the operation (algorithm) of the cryptographical pseudo-random number generation apparatus according to the third embodiment of the present invention;

FIG. 7 is a block diagram of the system configuration of the cryptographical pseudo-random number generation apparatus according to the fourth embodiment of the present invention;

FIG. 9 is a block diagram of the system configuration of the cryptographical pseudo-random number generation apparatus according to the fifth embodiment of the present invention;

DESCRIPTION OF THE PREFERRED EMBODIMENTS

Figure 1:
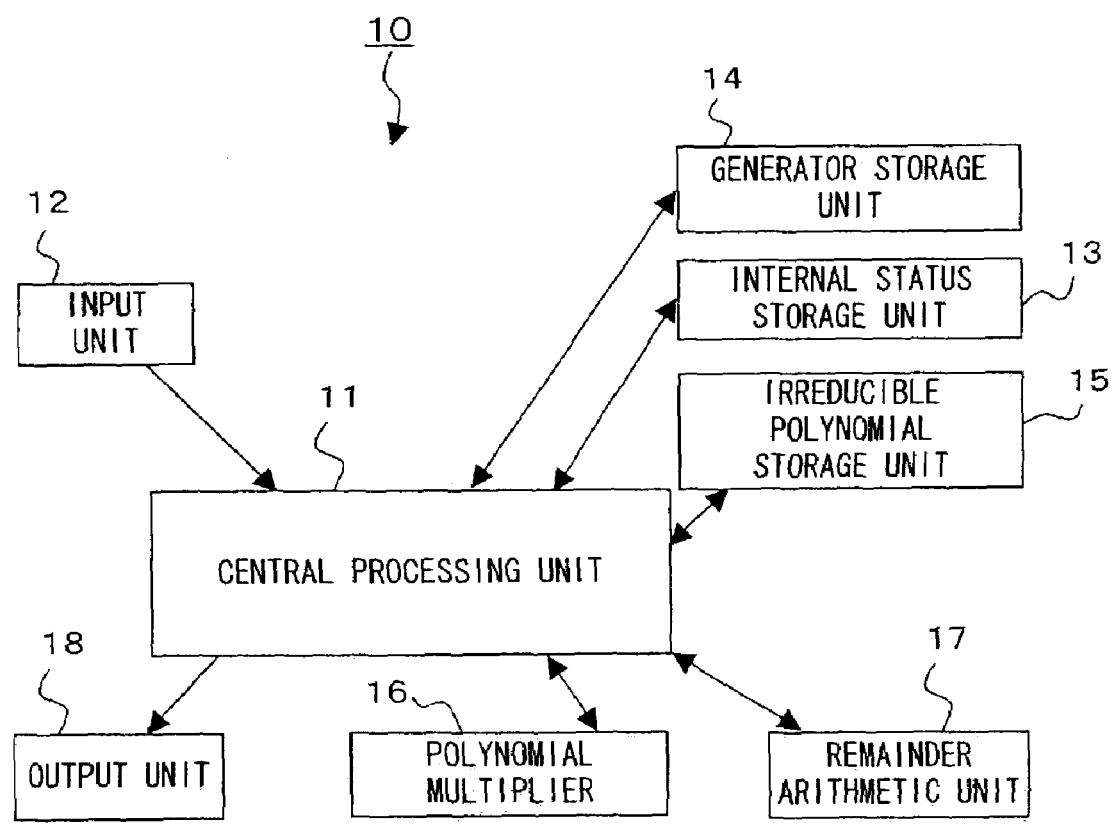
FIG. 1 is a block diagram of the system configuration of the cryptographical pseudo-random number generation apparatus according to the first embodiment of the present invention.

The embodiments of the present invention are described below by referring to the attached drawings.

First Embodiment

According to the first embodiment of the present invention, the update of the internal status $s_i$ is represented by $$s_i = g^s (\mathrm{mod} f(t)) \qquad (1)$$

where p indicates a prime number and 2P−1 is also a prime number;

g indicates a generator of the value of p bits;

c indicates a natural number;

s indicates the value of the low order c bits of the internal status $s_{i-1}$ of p bits; and f(t) indicates an irreducible polynomial of the {0, 1} coefficient.

The i-th output is represented by $$\mathrm{out}_i = msb\ o(s_i) \qquad (2)$$

where msb $o(s_i)$ indicates the high order o bits of the internal status $s_i$ of p bits wherein:

$$o = k - c$$

$$c + o \leq p$$

$$c = \omega(\log k)$$

where ω in ω (log k) indicates the notation prescribing the class of a function, and the base of log k is represented by 2, thereby realizing the pseudo-random number generating system.

The above mentioned equation (1) clearly indicates the algorithm representation. In the mathematical representation, $s_i = g^s$ is prescribed as an abstractive operation. Therefore, if the above mentioned equation (1) is mathematically represented, modf (t) is not required.

That is, the above mentioned equation (1) can be mathematically represented as follows.

$$s_i = g^s \qquad (1),$$

The equations (1) and (2) above are described below furthermore in detail.

ω is a notation prescribing a function as described above, and refers to a set as shown below. Assuming that f(k) is a function, ω(f(k)) is defined as a plurality of sets g(k) satisfying g(k)>r·f(k) for an infinite number of k's on all positive real numbers r.

In the equation (1), f(k)=log k, and ω(log k) is a plurality of sets g(k) satisfying g(k)>r·log k for an infinite number of k's on all positive real numbers r.

Furthermore, c is a function relative to k. when a natural number is assigned to k in the functions belonging to ω(log k), a function of a natural number can be selected. For example, the function which rounds up the decimal places of (log k)$^2$ belongs to ω(log k). Thus, when c is a natural number, the problem that ω (log k) cannot be a natural number can be avoided.

Additionally, c or o is not determined first, but k is determined first, and c is determined as a function of k. The maximum value of o is determined as k−c. c is obtained by an inputting operation. That is, the value of a function of c is input based on the assumed k.

At this time, assuming that there is any random number in the pseudo-random number string generated as described above which can be discriminated from an intrinsic random number in the statistical test, it is mathematically proved that a discrete logarithm problem can be efficiently (in a polynomial time) solved in the test. However, since a discrete logarithm problem is considered not to be solved in a polynomial time, the presumption that the pseudo-random number string generated according to the first embodiment of the present invention can be discriminated from an intrinsic random number in the statistical test is denied. Therefore, it is mathematically proved in the reduction to absurdity that the pseudo-random number string generated according to the first embodiment of the present invention cannot be discriminated from an intrinsic random number, and cannot be solved in the statistical test.

FIG. 1 is a block diagram of the configuration of the system of the cryptographical pseudo-random number generation apparatus according to the first embodiment of the present invention.

A cryptographical pseudo-random number generation apparatus 10 shown in FIG. 1 comprises a central processing unit 11, an input unit 12, an internal status storage unit 13, a generator storage unit 14, an irreducible polynomial storage unit 15, a polynomial multiplier 16, a remainder arithmetic unit 17, and an output unit 18. The word length of the numeric data processed by the calculation unit of the apparatus 10 is w bits.

The central processing unit 11 is connected to other components through an interface, assigns an operation to each component as necessary, and manages the information communicated between components.

The input unit 12 inputs three natural numbers c, o, and a, and two bit strings of a bit length p. However, p is a prime number, and $2^p-1$ is also a prime number.

The internal status storage unit 13 is a rewritable storage device storing n words, and stores a bit string of a bit length p. However, r<w, and p=nw−r.

The generator storage unit 14 is a rewritable storage device storing n words, and stores a bit string of a bit length p. However, r<w, and p=nw−r.

The irreducible polynomial storage unit 15 is a p bit storage device. If the bit string representation of p bit data stored in the irreducible polynomial storage unit 15 is $b_{p-1}b_{p-2} \ldots b_1b_0$, then it corresponds to the irreducible polynomial $$f(t)=t^p+b_{p-1}t^{p-1}+b_{p-2}t^{p-2}+\ldots+b_1t+b_0 \qquad (3)$$

An irreducible polynomial refers to a polynomial which cannot be factored.

The polynomial multiplier 16 calculates a product of a polynomial corresponding to bit strings when two p-bit bit strings are provided, and returns a product represented by a polynomial as a value in bit representation. Assuming that the p-bit bit string is $b_{p-1}b_{p-2} \ldots b_1b_0$, it corresponds to the polynomial $$b_{p-1}t^{p-1}+b_{p-2}t^{p-2}+\ldots+b_1t+b_0 \qquad (4)$$

The product of the polynomial (4) is represented by 2p bits at most.

The remainder arithmetic unit 17 returns the polynomial of the remainder obtained by dividing the polynomial (4) represented by the 2p bits by the irreducible polynomial (3) in bit representation. Since the irreducible polynomial (3) is the p-th degree, the remainder is constantly p−1 or less, and is represented by p bits.

The output unit 18 outputs the high order o bits in the arithmetic result represented by p bits from the polynomial multiplier 16.

Figure 2:
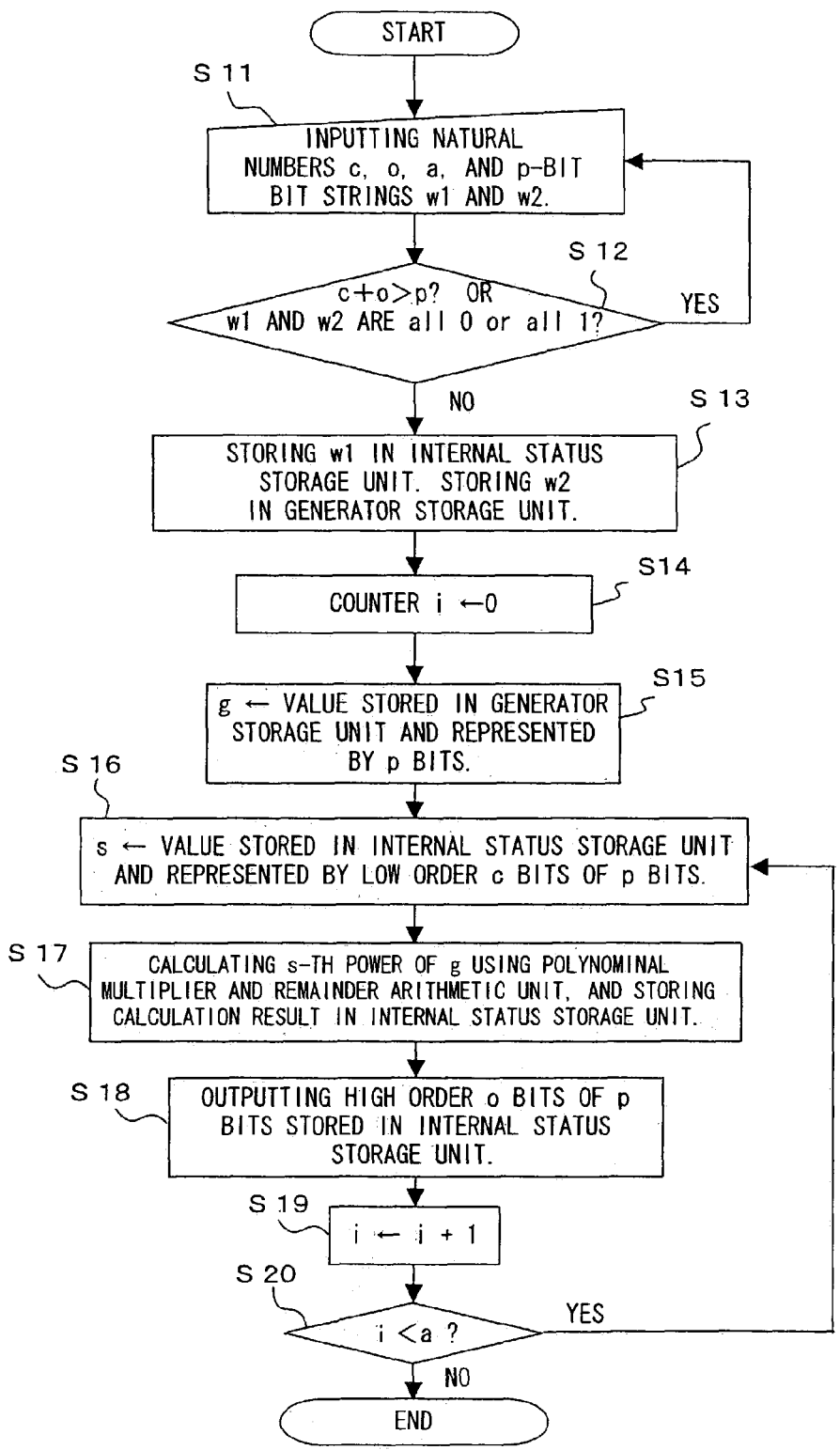
FIG. 2 is a flowchart for explanation of the operation (algorithm) of the cryptographical pseudo-random number generation apparatus according to the first embodiment of the present invention.

Then, the operations of the cryptographical pseudo-random number generation apparatus 10 with the above mentioned configuration are described below by referring to the flowchart shown in FIG. 2.

First, the natural numbers c, o, and a, and a p-bit bit string w1 and w2 are input through the input unit 12 (step S11). Then, it is determined whether c+o>p (condition 1) or all bits of at least one of the bit strings w1 and w2 are 0 or 1 (condition 2) (step S12) If at least one of the conditions 1 and 2 holds, then control is returned to step S11. If the condition 1 is not satisfied, then the security of generated encrypted data is not assured. Furthermore, a bit string satisfying the condition 2 is not appropriate as initial data.

On the other hand, if the above mentioned conditions 1 and 2 do not hold, the p-bit bit strings w1 and w2 are stored in the internal status storage unit 13 and generator storage unit 14 respectively (step S13), and the counter variable i is set to 0 (step S14).

Then, it is assumed that the value represented by p bits stored in the generator storage unit 14 is g (step S15). Then, the value represented by the low order c bits of the p bits stored in the internal status storage unit 13 is assumed to be s (step S16).

The polynomial multiplier 16 and the remainder arithmetic unit 17 calculate the s-th power of g ($=g^s$), and the calculation result is stored in the internal status storage unit 13 (step S17).

The calculation in step S17 is performed by $$g^s=g^{2^{c-1}b_{c-1}}\cdot g^{2^{c-2}b_{c-2}} \ldots g^{2b_1}\cdot g^{b_0} \qquad (5)$$

based on the bit string s ($=b_{c-1}b_{c-2} \ldots b_0$). The calculation is realized by the products obtained c times at most. In the arithmetic operation of $g^s$, the calculation is performed only on the term $g^{2^j}$, that is, $$b_j=1 (j=c-1, c-2, \ldots, 1, 0).$$

Therefore, if g is repeatedly squared, the multiplication performed c−1 times realizes the calculation ($g^s=g\cdot g^2\cdot g^4\cdot \ldots \cdot g^{2^{c-2}}\cdot g^{2^{c-2}}\cdot g^{2^{c-1}}$).

Each multiplication in the equation (5) is performed by the polynomial multiplier 16. Immediately after each multiplication, the remainder arithmetic unit 17 is used to calculate $g^s(\text{mod} f(t))$, and the calculation result is used to represent $g^s$ in p bits. Then, the calculation result of $g^s$ represented in p bits is stored in the internal status storage unit 13.

After step S17, the output unit 18 outputs the high order o bits as a random number in the arithmetic result of $g^s$ of p bits stored in the internal status storage unit 13 (step S18).

Then, the variable i is incremented by 1 (step S19), and it is determined whether or not i<a (step S20). If i<a, control is returned to step S16.

Thus, the processes in step S16 to S20 are repeated until i=a to generate a random numbers. When a random numbers are output, the process terminates.

Thus, according to the first embodiment, $g^s$ (mod f (t)) is calculated, and the high order o bits of the calculation result of the p bits are stored as a random number in the internal status storage unit 13, and the value of the o bit stored in the internal status storage unit 13 is output as a random number, thereby repeating a times a series of the processes, and generating a cryptographical pseudo-random numbers.

Second Embodiment

According to the second embodiment of the present invention, the update of the internal status $s_i$ is represented by $$s_i = xg^s \pmod{f(t)} \quad (6)$$

where p indicates a prime number and $2^p - 1$ is also a prime number;

g indicates a generator of the value of the first p bits;

x indicates the value of the second p bits;

s indicates the value of the low order c bits of the internal status $s_{i-1}$ of p bits; and the i-th output is represented by $$\text{out}_i = \text{msb}_o(s_i) \quad (7)$$

where $\text{msb}_o(s_i)$ indicates the high order o bits of the internal status $s_i$ of p bits wherein:

$$o = k - c$$

$$c + o \leq p$$

$$c = \omega(\log k)$$

thereby realizing a pseudo-random number generation system.

FIG. 3 is a block diagram of the system configuration of the cryptographical pseudo-random number generation apparatus according to the second embodiment of the present invention.

In FIG. 3, the component also shown in FIG. 1 is the same reference numeral.

A cryptographical pseudo-random number generation apparatus 20 shown in FIG. 3 is configured by adding a base point storage unit 21 to the cryptographical pseudo-random number generation apparatus 10 according to the first embodiment shown in FIG. 1, and other components are the same as the components of the cryptographical pseudo-random number generation apparatus 10. Therefore, in the explanation of the configuration of the cryptographical pseudo-random number generation apparatus 20, only the components different from those of the cryptographical pseudo-random number generation apparatus 10 are explained. The word length of the calculation device of the present apparatus 20 is w bits as the cryptographical pseudo-random number generation apparatus 10.

As the input unit 12, an input unit 12a inputs three natural numbers c, o, and a, but, unlike the input unit 12, the number of bit strings of a bit length p is not two but three.

The base point storage unit 21 is a rewritable storage device storing n words (1 word is w bits) where r<w, and p=nw−r.

Figure 4:
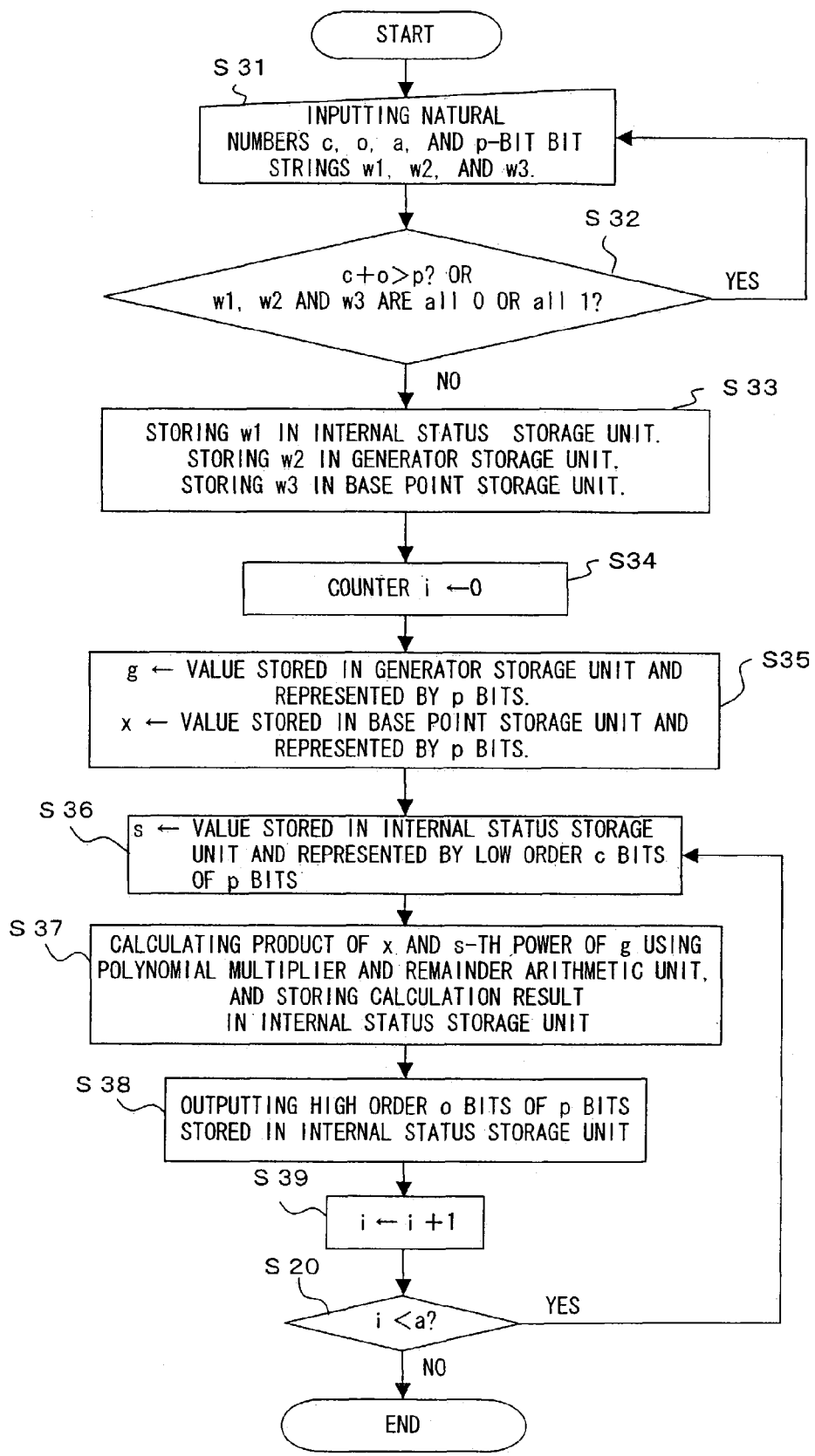
FIG. 4 is a flowchart for explanation of the operation (algorithm) of the cryptographical pseudo-random number generation apparatus according to the second embodiment of the present invention.

The operations (cryptographical algorithm) of the cryptographical pseudo-random number generation apparatus 20 with the above mentioned configuration are described below by referring to the flowchart shown in FIG. 4.

First, the natural numbers c, o, and a, and a p-bit bit string w1, w2, and w3 are input through the input unit 12a (step S31). Then, it is determined whether c+o>p (condition 1) or all bits of at least one of the bit strings w1 and w2 are 0 or 1 (condition 2) (step S32). If at least one of the conditions 1 and 2 holds, then control is returned to step S31. If the condition 1 is not satisfied, then the security of generated encrypted data is not assured. Furthermore, a bit string satisfying the condition 2 is not appropriate as initial data.

On the other hand, if the above mentioned conditions 1 and 2 do not hold, the p-bit bit strings w1, w2, and w3 are stored in the internal status storage unit 13, the generator storage unit 14, and the base point storage unit 21 respectively (step S33), and the counter variable i is set to 0 (step S34).

Then, it is assumed that the value represented by p bits stored in the generator storage unit 14 is g, and the value represented by the low order c bits in the p bits stored in the base point storage unit 21 is x (step S35). Then, the value represented by the low order c bits of the p bits stored in the internal status storage unit 13 is assumed to be s (step S36).

The polynomial multiplier 16 and the remainder arithmetic unit 17 calculate the product of the s-th power of g ($=g^s$) and x, and the calculation result is stored in the internal status storage unit 13 (step S37).

The calculation in step S37 is performed by $$g^s = g^{2^{c-1}b_{c-1}} \cdot g^{2^{c-2}b_{c-2}} \cdots g^{2b_1} \cdot g^{b_0} \quad (8)$$

based on the bit string s ($= b_{c-1} b_{c-2} \ldots b_0$).

The calculation is performed by the polynomial multiplier 16 and the remainder arithmetic unit 17 as in the second embodiment, and the representation of $g^s$ is constantly p bits. Furthermore, the product $xg^s$ of x and $g^s$ is calculated. Then, the calculation result of the $xg^s$ represented by p bits obtained by operating the remainder arithmetic unit 17 is stored in the internal status storage unit 13.

After step S37, the output unit 18 outputs the high order o bits as a random number in the arithmetic result of $xg^s$ of p bits stored in the internal status storage unit 13 (step S38).

Then, the variable i is incremented by 1 (step S39), and it is determined whether or not i<a (step S40). If i<a, control is returned to step S36.

Thus, the processes in step S36 to S40 are repeated until i=a to generate a random numbers. When a random numbers are output, the process terminates.

Thus, according to the second embodiment, $xg^s$ (mod f (t)) is calculated, and the high order o bits of the calculation result of the p bits are stored as a random number in the internal status storage unit 13, and the value of the o bit stored in the internal status storage unit 13 is output as a random number, thereby repeating a times a series of the processes, and generating a cryptographical pseudo-random numbers. According to the second embodiment, since the number of internal statuses stored in the internal status storage unit 13 is larger than in the first embodiment, a cryptographical pseudo-random number can be generated with higher security than in the first embodiment.

Third Embodiment

According to the third embodiment of the present invention, the update of the internal status $s_i$ is represented by $$s^i = (x + d \bmod 2^p - 1) g^s \quad (9)$$

where p indicates a prime number and $2^p - 1$ is also a prime number;

g indicates a generator of the value of the first p bits;

x indicates the value of the second p bits;

d indicates a natural number;

s indicates the value of the low order c bits of the internal status $s_{i-1}$ of p bits; and the i-th output is represented by $$out_i = msb_o(s_i) \qquad (10)$$

where $msb_O(s_i)$ indicates the high order o bits of the internal status $s_i$ of p bits wherein:

$$o = k - c$$

$$c + o \leq p$$

$$c = \omega(\log k)$$

thereby realizing a pseudo-random number generation system.

FIG. 5 is a block diagram of the system configuration of the cryptographical pseudo-random number generation apparatus according to the third embodiment of the present invention.

In FIG. 5, the component also shown in FIG. 3 is the same reference numeral.

A cryptographical pseudo-random number generation apparatus 30 shown in FIG. 5 is configured by adding a multiple length adder 31 to the cryptographical pseudo-random number generation apparatus 20 according to the second embodiment shown in FIG. 3, and other components are the same as the components of the cryptographical pseudo-random number generation apparatus 20. Therefore, in the explanation of the configuration of the cryptographical pseudo-random number generation apparatus 30, only the components different from those of the cryptographical pseudo-random number generation apparatus 20 are explained. The word length of the calculation device of the present apparatus 30 is w bits as the cryptographical pseudo-random number generation apparatus 20.

Unlike the input unit 12a, an input unit 12b inputs four natural numbers c, o, a, and d, and, as the input unit 12a, inputs three bit strings of a bit length p. The multiple length adder 31 calculates a sum of the two natural numbers represented by p bits at most (n words at most). When the calculation result is 2p bits or more, the highest order bit is set to 0, and adds 1 to the value (the operation corresponds to the arithmetic for obtaining a remainder of the division of dividing the above mentioned sum by $2^p-1$).

The operations (cryptographical algorithm) of the cryptographical pseudo-random number generation apparatus 30 with the above mentioned configuration are described below by referring to the flowchart shown in FIG. 6.

First, the four natural numbers c, o, a, and d, and a p-bit bit string w1, w2, and w3 are input through the input unit 12b (step S51). Then, it is determined whether c+o>p (condition 1) or all bits of at least one of the bit strings w1 and w2 are 0 or 1 (condition 2) (step S52). If at least one of the conditions 1 and 2 holds, then control is returned to step S51. If the condition 1 is not satisfied, then the security of generated encrypted data is not assured. Furthermore, a bit string satisfying the condition 2 is not appropriate as initial data.

On the other hand, if the above mentioned conditions 1 and 2 do not hold, the p-bit bit strings w1, w2, and w3 are stored in the internal status storage unit 13, the generator storage unit 14, and the base point storage unit 21 respectively (step S53), and the counter variable i is set to 0 (step S54).

Then, it is assumed that the value represented by p bits stored in the generator storage unit 14 is g, and the value represented by the low order c bits in the p bits stored in the base point storage unit 21 is x (step S55). Then, the value represented by the low order c bits of the p bits stored in the internal status storage unit 13 is assumed to be s (step S56).

The polynomial multiplier 16 and the remainder arithmetic unit 17 calculate the product of the s-th power of g ($=g^s$) and x, and the calculation result is stored in the internal status storage unit 13 (step S57)

The calculation in step S57 is performed by $$g^s = g^{2^{c-1}b_{c-1}} \cdot g^{2^{c-2}b_{c-2}} \cdots g^{2^{b_1}} \cdot g^{b_0} \qquad (11)$$

based on the bit string s ($=b_{c-1}b_{c-2} \ldots b_0$).

The calculation by the equation (11) is performed by the polynomial multiplier 16 and the remainder arithmetic unit 17 as in the second embodiment. Furthermore, the product $xg^s$ of x and $g^s$ is calculated. Then, the calculation result of the $xg^s$ represented by p bits obtained by operating the remainder arithmetic unit 17 is stored in the internal status storage unit 13.

After step S57, the output unit 18 outputs the high order o bits as a random number in the arithmetic result of $xg^s$ of p bits stored in the internal status storage unit 13 (step S58).

Then, the variable i is incremented by 1, and the multiple length adder 31 computes x+d (m o d $2^p-1$). The calculation result is represented by p bits. The calculation result is stored in the base point storage unit 21 (step S59). Then, it is determined whether or not I<a (step S60). If i<a, control is returned to step S56.

Thus, the processes instep S56 to S60 are repeated until i=a to generate a random numbers. When a random numbers are output, the process terminates.

Thus, according to the third embodiment, $xg^s$ (mod (f (t)) is calculated, the calculation result of the p bits is stored in the internal status storage unit 13, the high order o bits of the p bits stored in the internal status storage unit 13 is output as a random number, the value x stored in the base point storage unit 21 is assumed to be a multiple length value, the remainder obtained as a result of dividing a natural number d by $2^p-1$ is added to the multiple length value, and the sum is stored in the base point storage unit 21, thereby repeating a times a series of the processes, and generating a cryptographical pseudo-random numbers.

According to the third embodiment, since the value x of p bits stored in the base point storage unit 21 is changed at random, the number of internal statuses stored in the internal status storage unit 13 is larger than in the second embodiment, and a cryptographical pseudo-random number can be generated with higher security than in the second embodiment.

Practical Embodiment

For comprehensibility of the present invention, a practical embodiment of the cryptographical pseudo-random number generation apparatus 10 according to the first embodiment with the simplest configuration is described below. For simple explanation, k=5 in the following embodiment. However, for example, k=1000, etc. can be practically used.

In the present apparatus 10, p=5 because $2^p-1$ is defined as a Mersenne prime number. At this time, $2^p-1$ is also a prime number 31. It is assumed that natural numbers c=5, o=2, and a=4 are input into the input unit 12. Assume that $f(t)=t^5+t^2+1$ holds as one of the polynomials f(t) of degree 5. Additionally, $g=t^2$ is assumed as a generator g. At this time, the polynomial f(t) is represented by a 5-bit bit string $\{b_4b_3b_2b_1b_0\}$ of "00101", and the generator g is represented as a 5-bit bit string of "00100". The input initial internal status is assumed to be "01111". In this case, the operations of the flowchart shown in FIG. 2 are as follows.

[when i=0]

Since the internal status is 01111, the low order 3 bits (c=3) is 111, and the value is 7 (s=7). Therefore, when $(t^2)^7$ (m o d f (t)) is calculated, the result is $t^4+t^3+t^2+1$. Since it is the bit representation of 11101, the high order 2 bits of 11 (o=2) are output.

[when i=1]

Since the internal status is 11101, the low order 3 bits (c=3) is 101, and the value is 5 (s=5). Therefore, when $(t^2)^5$ (m o d f (t)) is calculated, the result is $t^4+1$. Since it is the bit representation of 00100, the high order 2 bits of 00 (o=0) are output.

[when i=2]

Since the internal status is 10001, the low order 3 bits (c=3) is 001, and the value is 1 (s=1). Therefore, when $(t^2)^1$ (m o d f (t)) is calculated, the result is $t^2$. Since it is the bit representation of 10001, the high order 2 bits of 10 (o=2) are output.

[when i=3]

Since the internal status is 00100, the low order 3 bits (c=3) is 100, and the value is 4 (s=4). Therefore, when $(t^2)^4$ (m o d f (t)) is calculated, the result is $t^3+t^2+1$. Since it is the bit representation of 01101, the high order 2 bits of 01 (o=2) are output.

[when i=4]

i=a=4, thereby terminating the process.

Fourth Embodiment

According to the fourth embodiment of the present invention, the update of the internal status $s_i$ is represented as follows.

$$s_i = f^s(s_{i-1}) \qquad (12)$$

where p indicates a prime number, and $2^p-1$ is also a prime number;

s indicates the value of the specified c bits of $s_{i-1}$ of p bits, and the i-th output is represented by the specific bits other than the bits used for obtaining s of $out_i=s_i$ for realizing the pseudo-random number generation system. However, f indicates a linear transform, and can be realized by a logical arithmetic unit and a shift processor. $f^s$ is arithmetic performed by s times repeating the f operation.

According to the present embodiment, f is performed by the logical arithmetic unit and the shift processor. Therefore, the f operation can be performed more quickly than using a multiplier. "s" is a value of the specific c bits retrieved from $s_{i-1}$, and the specific bits defining $out_i$, is selected from the bits other than the bits defining the "s".

With the above mentioned configuration, the effect of s can work on easily calculated f, thereby generating a random number with high security. Especially, assuming that there is any random number in the pseudo-random number string generated as described above which can be discriminated from an intrinsic random number in the statistical test depending on the method of selecting f and the method of prescribing the bits for definition of s described in the following embodiments, it is mathematically proved that a discrete logarithm problem can be efficiently (in a polynomial time) solved in the test. However, since a discrete logarithm problem is considered not to be solved in a polynomial time, the presumption that the pseudo-random number string generated according to the first embodiment of the present invention can be discriminated from an intrinsic random number in the statistical test is denied. Therefore, it is mathematically proved in the reduction to absurdity that the pseudo-random number string generated according to the fourth embodiment of the present invention cannot be discriminated from an intrinsic random number, and cannot be solved in the statistical test (in a polynomial time).

FIG. 7 is a block diagram of the configuration of the system of the cryptographical pseudo-random number generation apparatus according to the fourth embodiment of the present invention.

A cryptographical pseudo-random number generation apparatus 40 shown in FIG. 7 comprises a central processing unit 41, an input unit 42, an internal status storage unit 43, an arithmetic unit 44, and an output unit 45.

The central processing unit 41 is connected to other components in the system through an interface, assigns an operation to each component as necessary, and manages the information communicated between components.

The input unit 42 inputs natural numbers $c_1, \ldots, c_u$, $o_1, \ldots, o_v$, a and a bit length p. However, $(u+v \leq p)$, and $(c_i \leq p$, and $o_i \leq p$ for all i's) and $c_i \neq o_j$ where p indicates a prime number, and $2^p-1$ also indicates a prime number. The word length of the calculation device of the present apparatus 40 is w bits.

The internal status storage unit 43 is a rewritable storage device storing n words, and stores a bit string of a bit length p. However, r<w, and p=nw−r.

The arithmetic unit 44 comprises a word-unit logical arithmetic unit 44a and a shift processor 44b, and calculates $f^s(x)$ for word-unit update of the status of the p bits stored in the internal status storage unit 43.

The output unit 45 outputs the result of the calculation of $f^s(x)$.

Figure 8:
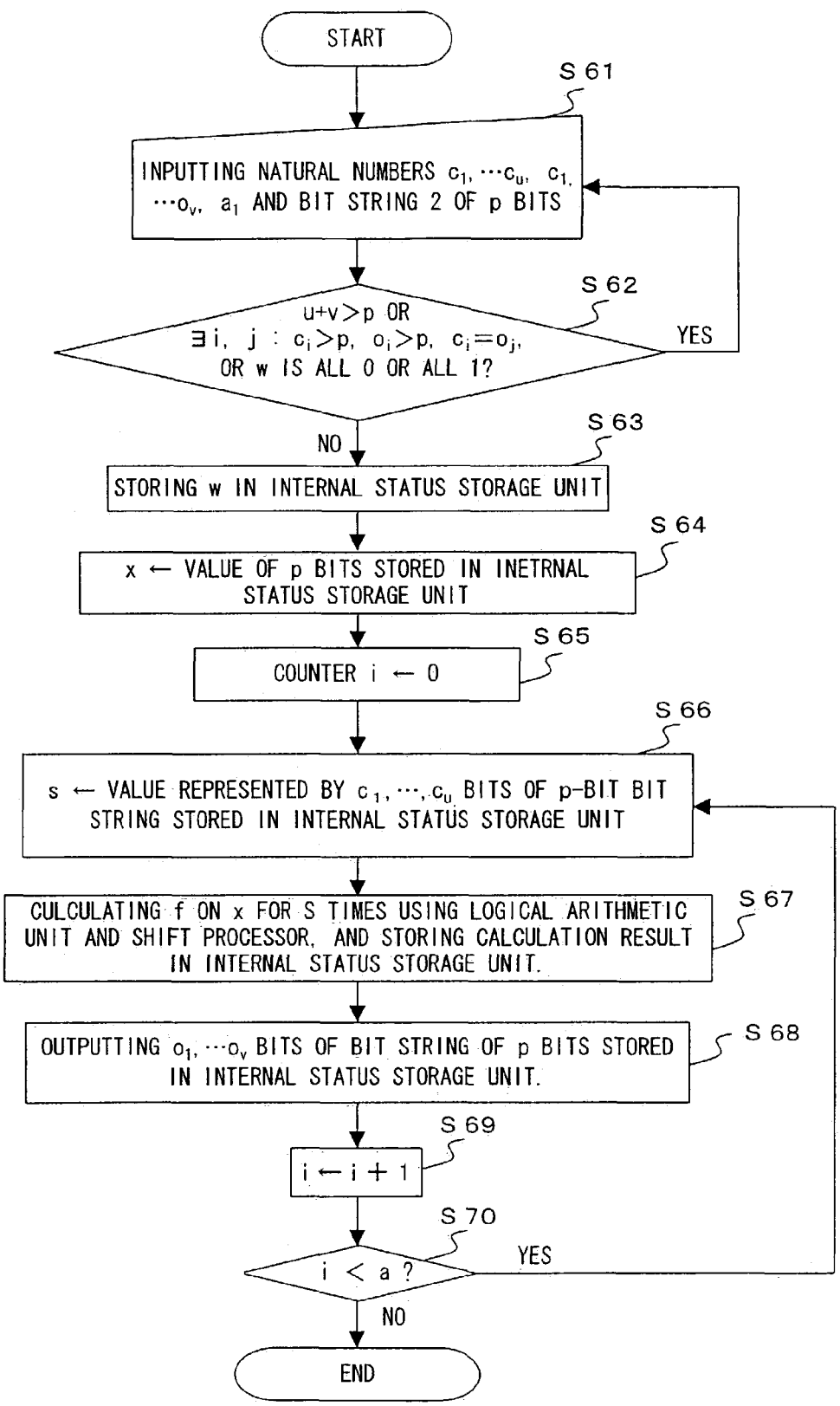
FIG. 8 is a flowchart for explanation of the operation (algorithm) of the cryptographical pseudo-random number generation apparatus according to the fourth embodiment of the present invention.

The operations (algorithm) of the cryptographical pseudo-random number generation apparatus 40 according to the fourth embodiment with the above mentioned configuration are described below by referring to the flowchart shown in FIG. 8.

First, the input unit 42 inputs the above mentioned natural numbers $c_1, c_2, \ldots, c_u, o_1, o_2, \ldots o_v$, a and the bit string w of a bit length p (step S61).

Then, it is determined whether the condition is $\{u+v>p\}$ (condition 1), {there is an i where $c_i>p$ or $o_i>p$} (condition 2), {there are an i and a j where $c_i=o_j$} (condition 3), or {all bits of the bit string w are 0 or 1} (condition 4) (step S62). If any of the conditions 1, 2, 3, and 4 holds, control is returned to step S61, and the input unit 42 newly inputs natural numbers $c_1, c_2, \ldots, c_u, o_1, o_2, \ldots o_v$, a and the bit string w of a bit length p.

On the other hand, if it is determined that any of the conditions 1, 2, 3, and 4 does not hold in step S62, the bit string w of p bits is stored in the internal status storage unit 43 (step S63), and the value of the p bits stored in the internal status storage unit 43 is set to x (step S64). Then, the counter variable i is set to 0 (step S65), and the logical arithmetic unit 44a and the shift processor 44b of the arithmetic unit 44 for updating the internal status perform the calculations times (calculates f$^s$), and the calculation result (value of f$^s$ represented by p bits) is stored in the internal status storage unit 43 (step S67).

The output unit 45 outputs all bits prescribed by $o_1, o_2, \ldots o_v$ in the p bits stored in the internal status storage unit 43 (step S68). Then, the variable i is incremented by 1 (step S69), it is determined whether or not i<a (step S70), and control is returned to step S66 if i<a.

Thus, the processes in steps S66 through S70 are performed repeatedly until the value of i becomes a (i=a), thereby outputting a random numbers from the output unit 45. If it is determined in step S70 that i=a, then the processes terminate.

Fifth Embodiment

According to the fifth embodiment of the present invention, the update of the internal status $s_i$ is represented as follows.

$$s_i = f^s(s_{i-1}) \quad (13)$$

where p indicates a prime number, and $2^p - 1$ is also a prime number;

s indicates the value of the specified c bits of $s_{i-1}$ of p bits, and the i-th output is represented by the specific bits other than the bits used for obtaining s of $out_i = s_i$ for realizing the pseudo-random number generation system. However, f indicates a linear transform, and can be realized by a logical arithmetic unit and a shift processor. f$^s$ is arithmetic performed by s times repeating the f operation.

FIG. 9 is a block diagram of the system configuration according to the fifth embodiment of the present invention. In a cryptographical pseudo-random number generation apparatus 50 shown in FIG. 9, the component also shown as the component of the cryptographical pseudo-random number generation apparatus 40 according to the fourth embodiment shown in FIG. 7 is assigned the same reference numeral. The difference between the cryptographical pseudo-random number generation apparatus 50 and the cryptographical pseudo-random number generation apparatus 40 is that the cryptographical pseudo-random number generation apparatus 50 additionally comprises a multiple length adder 51. Furthermore, an input unit 42a inputs a natural number d in addition to the natural numbers $c_1, c_2, \ldots, c_{u-1}, c_u, o_1, o_2, \ldots, o_v$, a. Therefore, the explanation of the configuration of the cryptographical pseudo-random number generation apparatus 50 is made on the multiple length adder 51 only, and the explanation of other components are omitted here.

The multiple length adder 51 calculates the sum of the two natural numbers represented by p bits at most (n words at most). If the calculation result is 2p bits or more, the highest order bit is set to 0, and 1 is added to the result (this operation corresponds to the operation of obtaining the remainder of the division of dividing the sum by $2^p - 1$).

Figure 10:
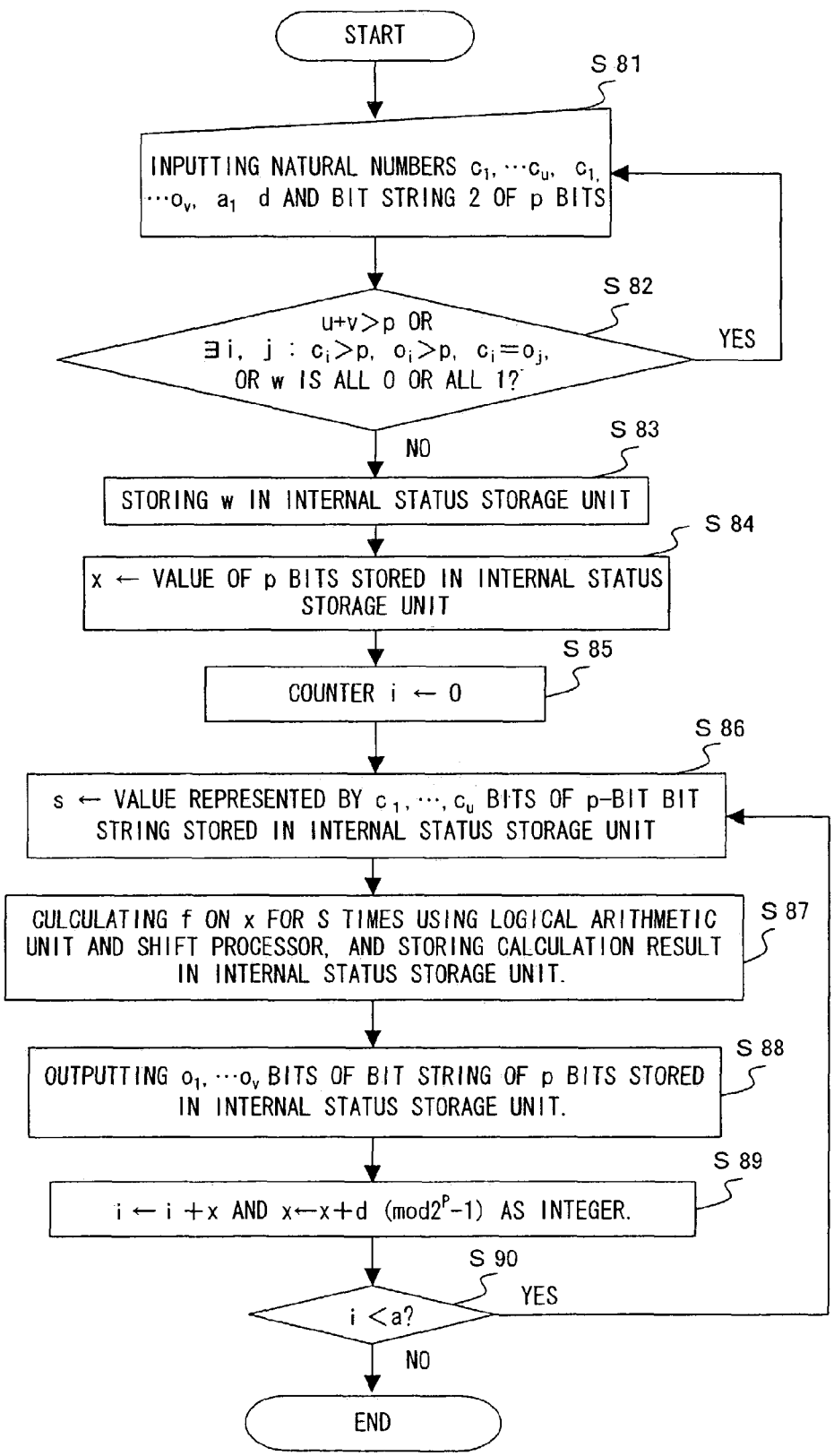
FIG. 10 is a flowchart for explanation of the operation (algorithm) of the cryptographical pseudo-random number generation apparatus according to the fifth embodiment of the present invention.

The operations (algorithm) of the cryptographical pseudo-random number generation apparatus 50 according to the fifth embodiment with the above mentioned configuration are described below by referring to the flowchart shown in FIG. 10.

First, the input unit 42a inputs the above mentioned natural numbers $c_1, c_2, \ldots, c_u, o_1, o_2, \ldots o_v$, a, d and the bit string w of a bit length p (step S81). Then, it is determined whether the condition is {u+v>p} (condition 1), {there is an i where $c_i > p$ or $o_i > p$} (condition 2), {there are an i and $a_j$ where $c_{i=oj}$} (condition 3), or {all bits of the bit string w are 0 or 1} (condition 4) (step S82). If any of the conditions 1, 2, 3, and 4 holds, control is returned to step S81, and the input unit 42a newly inputs natural numbers $c_1, c_2, \ldots, c_u, o_1, o_2, \ldots, o_v$, a, d and the bit string w of a bit length p.

On the other hand, if it is determined that any of the conditions 1, 2, 3, and 4 does not hold in step S82, the bit string w of p bits is stored in the internal status storage unit 43 (step S83), and the value of the p bits stored in the internal status storage unit 43 is set to x (step S84). Then, the counter variable i is set to 0 (step S85), and the logical arithmetic unit 44a and the shift processor 44b of the arithmetic unit 44 for updating the internal status performs the calculations times (calculates f$^s$), and the calculation result (value of f$^s$ represented by p bits) is stored in the internal status storage unit 43 (step S87). The output unit 45 outputs all bits prescribed by $o_1, o_2, \ldots, o_v$ in the p bits stored in the internal status storage unit 43 (step S88). Then, the variable i is incremented by 1, and the multiple length adder 51 calculates x+d (m o d $2^p - 1$). The calculation result is represented by p bits. The calculation result is stored in the internal status storage unit 43 (step S69) Then, it is determined whether or not i<a (step S90), and control is returned to step S86 if i<a. Thus, the processes in steps S86 through S90 are performed repeatedly until the value of i becomes a (i=a), thereby outputting a random numbers from the output unit 45. If it is determined in step S90 that i=a, then the processes terminate.

Sixth Embodiment

According to the sixth embodiment of the present invention, the update of the internal status $s_i$ is represented as follows.

$$s_i = f^s(f'(s_{i-1})) \quad (14)$$

where p indicates a prime number, and $2^p - 1$ is also a prime number;

s indicates the value of the specified c bits of $s_{i-1}$ of p bits, and the i-th output is represented by the specific bits other than the bits used for obtaining s of $out_i = s_i$ for realizing the pseudo-random number generation system.

However, f and f' indicate linear transforms, and can be realized by a logical arithmetic unit and a shift processor. f$^s$ is arithmetic performed by s times repeating the f operation.

Figure 11:
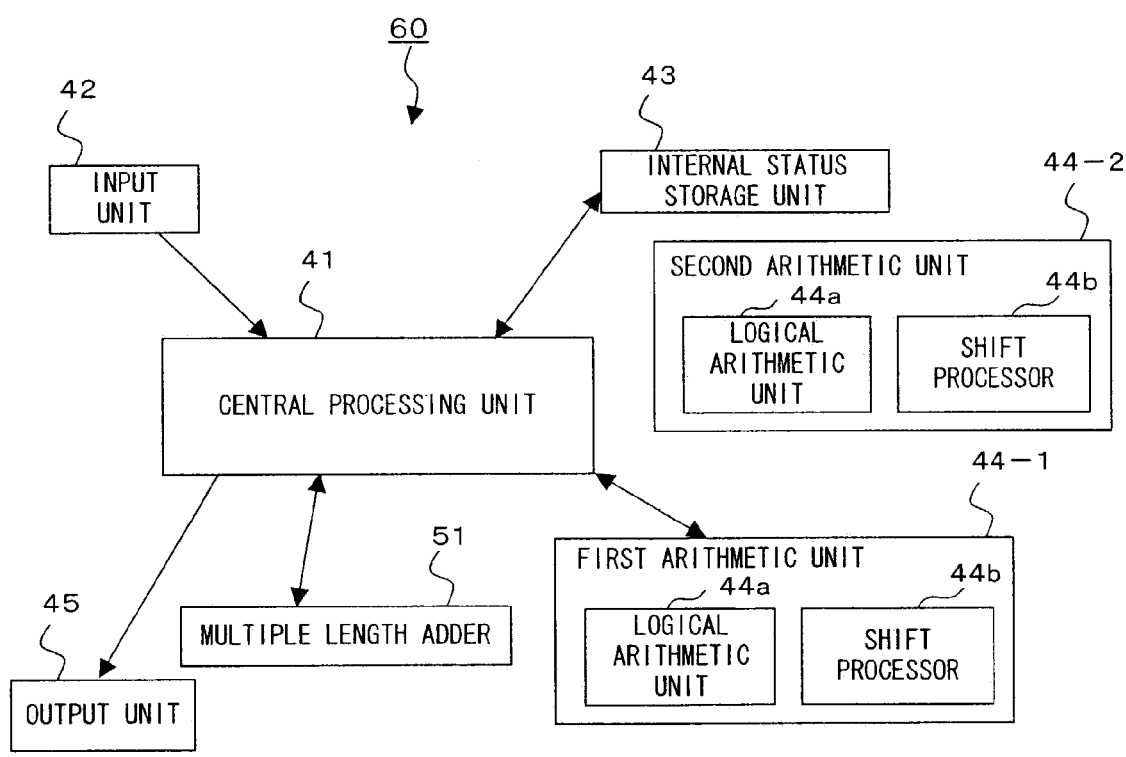
FIG. 11 is a block diagram of the system configuration of the cryptographical pseudo-random number generation apparatus according to the sixth embodiment of the present invention.

FIG. 11 is a block diagram of the system configuration according to the sixth embodiment of the present invention. In a cryptographical pseudo-random number generation apparatus 60 shown in FIG. 11, the component also shown as the component of the cryptographical pseudo-random number generation apparatus 40 according to the fourth embodiment shown in FIG. 7 is assigned the same reference numeral. The difference between the cryptographical pseudo-random number generation apparatus 60 and the cryptographical pseudo-random number generation apparatus 40 is that the cryptographical pseudo-random number generation apparatus 60 comprises two types of arithmetic units 44 (a first arithmetic unit 44-1 and a second arithmetic unit 44-2). The first and the second arithmetic units 44-1, 44-2 are similar in configuration to the arithmetic unit 44, and each of them comprises a logical arithmetic unit 44a and a shift processor 44b.

Figure 12:
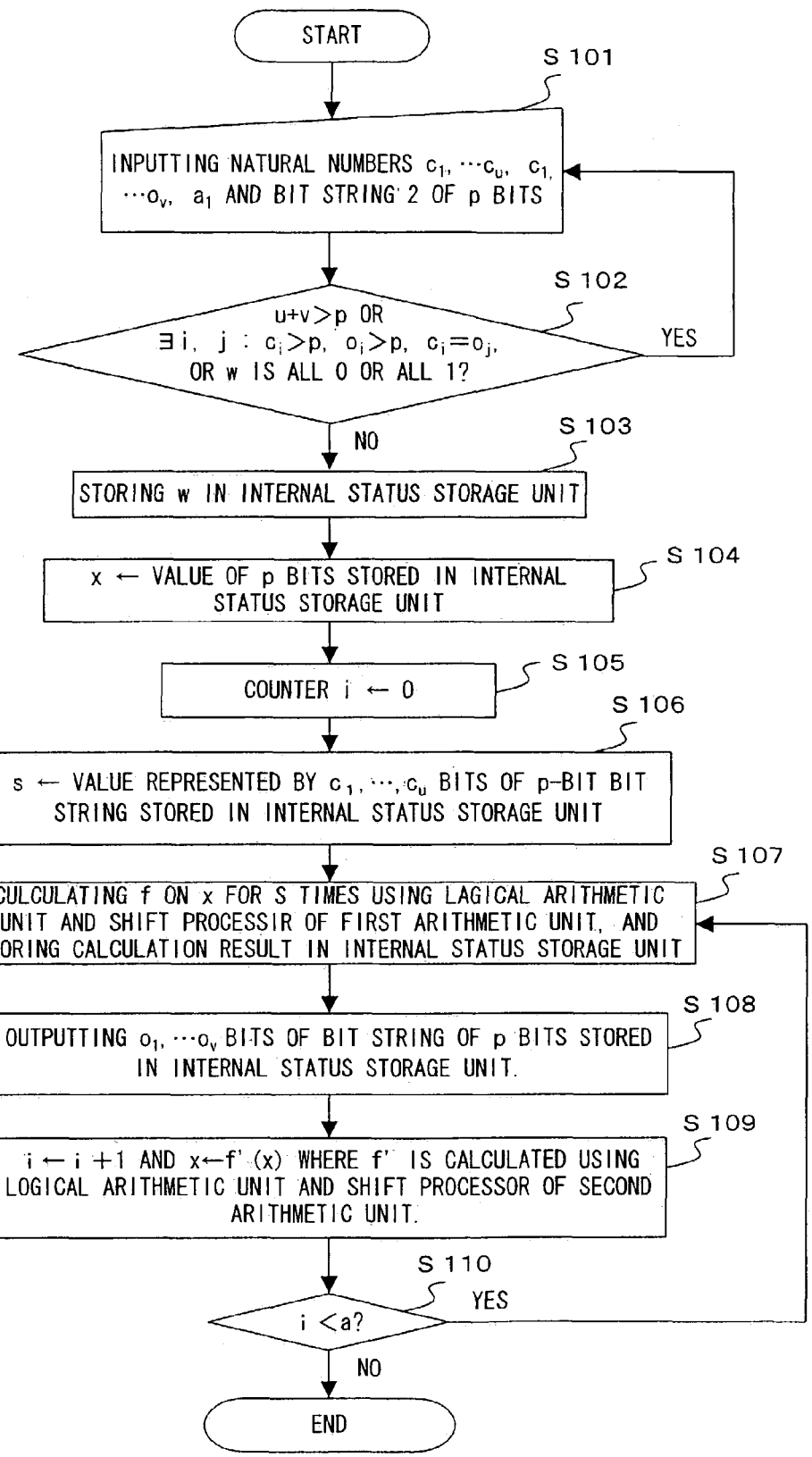
FIG. 12 is a flowchart for explanation of the operation (algorithm) of the cryptographical pseudo-random number generation apparatus according to the sixth embodiment of the present invention.

The operations (algorithm) of the cryptographical pseudo-random number generation apparatus 60 according to the sixth embodiment with the above mentioned configuration are described below by referring to the flowchart shown in FIG. 12.

First, the input unit 42 inputs the above mentioned natural numbers $c_1, c_2, \ldots, c_u, o_1, o_2, \ldots o_v$, a and the bit string w of a bit length p (step S101). Then, it is determined whether the condition is $\{u+v>p\}$ (condition 1), $\{$there is an i where $c_i>p$ or $o_i>p\}$ (condition 2), $\{$there are an i and $a_j$ where $c_i=o_j\}$ (condition 3), or $\{$all bits of the bit string w are 0 or 1$\}$ (condition 4) (step S102). If any of the conditions 1, 2, 3, and 4 holds, control is returned to step S101, and the input unit 42 newly inputs natural numbers $c_1, c_2, \ldots, c_u, o_1, o_2, \ldots, o_v$, a and the bit string w of a bit length p.

On the other hand, if it is determined that any of the conditions 1, 2, 3, and 4 does not hold in step S102, the bit string w of p bits is stored in the internal status storage unit 43 (step S103), and the value of the p bits stored in the internal status storage unit 43 is set to x (step S104).

Then, the counter variable i is set to 0 (step S105), and it is assumed that the value represented by $c_1, c_2, \ldots c_u$, bits of the bit string of p bits stored in the internal status storage unit 43 is s (step S106). Then, the logical arithmetic unit 44a and the shift processor 44b of the first arithmetic unit 44-1 perform s times the calculation of $f(f_1)$, and the calculation result is stored in the internal status storage unit 43 (step S107). Then, the output unit 45 outputs all bits prescribed by $o_1, o_2 \ldots o_v$ in the p bits stored in the internal status storage unit 43 (step S108). Then, the variable i is incremented by 1, the logical arithmetic unit 44a and the shift processor 44b of the second arithmetic unit 44-2 perform the calculation of $f'(f_2)$ on x, and the calculation result f'(x) of the p bits is stored in the internal status storage unit 43 (step S109). Then, it is determined whether or not i<a (step S110). If i<a, control is returned to step S106.

Thus, the processes in steps S106 through S110 are repeated until i reaches a (i=a), and a random numbers are output from the output unit 45. If it is determined in step S110 that i=a, the process terminates.

Practical Fourth Embodiment

According to the fourth embodiment, $2^p-1$ is a Mersenne prime number, and p=11213. At this time, 11213 is a prime number, and $2^{11213}-1$ is also a prime number. Assuming that the central processing unit 41 is a 32-bit CPU, and w=32, then the internal status is represented by n=351 words. However, in the 351 words, 1 word of 13 bits is used as the representation of the internal status (r=13). The internal status x is represented by $x=(x_{350}, \ldots x_1, x_0)$. The f representing the updating operation of the internal status x is represented as follows.

$$f(x) = (x_{350}, \ldots x_2, \text{(high order 13 bits of } x_1))$$

where high order 13 bits of x1 are calculated in the masking operation, that is, by the logical product arithmetic unit in the logical arithmetic unit 44a. Furthermore, $x_{351}$ is calculated in the following logical operation.

$$x_{351} = (x_{175}) \text{ EOR } (A)$$

where the exclusive logical sum EOR is calculated by the exclusive logical sum arithmetic unit in the logical arithmetic unit 44a. A is calculated by the following equation.

$$A = \text{shiftright}(y) \text{ EOR } b$$

where y is 32 bits of a total of low order 16 bits each of $x_0$ and $x_1$, and can be obtained by the shift processor 44b performing right shifting operation shiftright on the $x_0$ and $x_1$. b is "0" if the lowest order bit of y is 0, and "E4BD75F5" in the hexadecimal representation if the lowest order bit of y is 1. Therefore, A can be realized by a lo2gical product, a logical sum, a shifting operation, and an exclusive logical sum only. The calculation of f is realized by a logical operation and a shifting operation only. With the above mentioned values, the internal status x can be restored to the original status after repeating plural times the operation of f, and it is mathematically proved that the cycle is $2^{11213}-1$.

Furthermore, when x and f are provided, the problem of obtaining s from the value of $g^s(x)$ is a type of the discrete logarithm problem which is one of the most difficult calculation. Normally, assuming that $c=\omega(\log p)$, and especially low order c bits of the internal status is $c_1, c_2 \ldots c_u$ and high order 11213-c bits of the internal status is $o_1, o_2 \ldots o_v$, it is mathematically proved that the bit prediction problem of a pseudo-random number string is difficult. If the bit prediction problem of the above mentioned pseudo-random number string can be solved, the above mentioned discrete problem can be solved.

The first through sixth embodiments of the present invention have the following advantages over the BBS system and the BM system in processing speed.

In the BBS system, about log k bits can be output per multiplication. In the BM system, about k multiplications are required per arithmetic containing a power. On the other hand, according to the first through sixth embodiments of the present invention, co (log k) multiplications are required per arithmetic containing a power, and $k-\omega(\log k)$ bits can be output. Considering that about k=1000 is specified as a realistic security parameter, about 10 bits can be output per multiplication in the BBS system, and about 1 bit can be output per multiplication in the BM system. On the other hand, according to the first through sixth embodiments of the present invention, assuming that arithmetic containing a power can be performed by ten multiplications, about 99 bits can be output per multiplication, thereby calculating about ten times more quickly than the BBS system.

According to the fourth through sixth embodiment of the present invention, the linear transform matrix M can be appropriately selected to more quickly perform the calculation without multiple length operations.

{Example of Application of Cryptographical Pseudo-Random Number Generation Apparatus}

Figure 13:
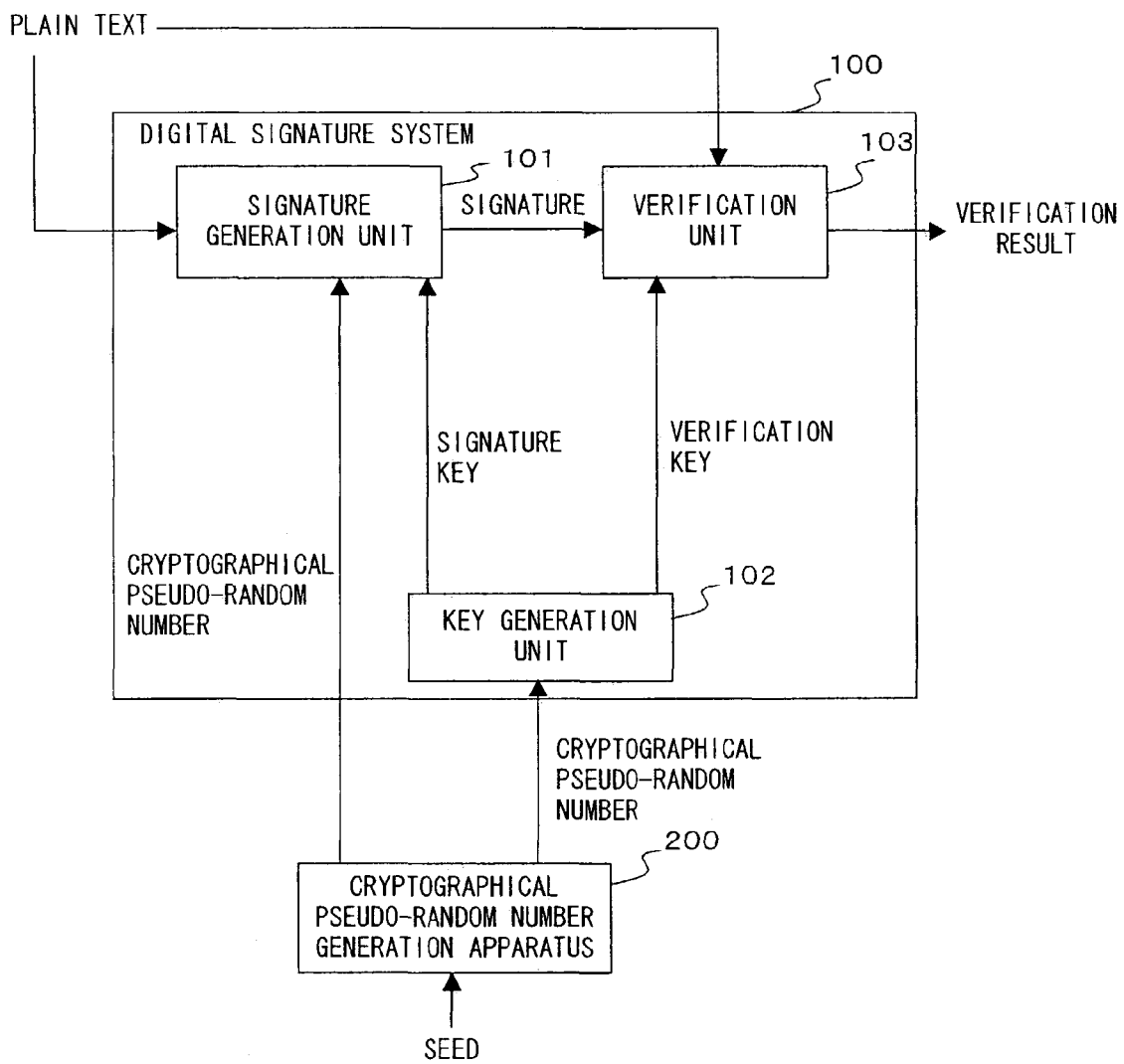
FIG. 13 is a block diagram of the system configuration of the digital signature system to which the present invention is applied.

FIG. 13 shows the system configuration of the digital signature system as an example of the cryptographical pseudo-random number generation apparatus according to the present invention.

A digital signature system 100 shown in FIG. 13 comprises a signature generation unit 101, a key generation unit 102, and a verification unit 103. A cryptographical pseudo-random number generation apparatus 200 according to the present invention (for example, the cryptographical pseudo-random number generation apparatuses 10, 20, 30, 40, 50, and 60) provides a pseudo-random number for the digital signature system 100. The pseudo-random number is input into the signature generation unit 101 and the key generation unit 102

The key generation unit 102 generates a signature key and a verification key based on the pseudo-random number input from the cryptographical pseudo-random number generation apparatus 200, and transmits the signature key and the verification key to the key generation unit 102 and the verification unit 103 respectively. The signature generation unit 101 inputs plain text, and generates the title of the text using the pseudo-random number provided by the cryptographical pseudo-random number generation apparatus 200 and the private key provided by the key generation unit 102.

The verification unit 103 verifies the title of the text received from the signature generation unit 101 using the verification key received from the key generation unit 102. In the verification, the plain text and the signature are used, and the verification result is output.

The digital signature system 100 generates and verifies the signature by, for example, the DSA (digital signature algorithm).

As described above, according to the present invention, the present invention can more quickly generate a pseudo-random number than the conventional technology with security for which it has been mathematically proved that the subsequent bits can hardly be predicted.

What is claimed is:

1. A cryptographical pseudo-random number generation apparatus functioning as a calculation device for word length of w bits, comprising:
    an input unit inputting natural numbers c, o, and a (c+o≦p where p indicates a prime number, and $2^p-1$ also indicates a prime number) and two bit strings (on condition that each bit string includes a bit of 0 and a bit of 1) of a bit length p;
    an internal status storage unit storing a first bit string of the bit length p input by said input unit;
    a generator storage unit storing a second bit string of the bit length p input by said input unit;
    an irreducible polynomial storage unit storing an irreducible polynomial f (t) ($=t^p+b_{p-1}t^{p-1}+b_{p-2}t^{p-2}+ \ldots +b_1t+b_0$) of a p-th {0, 1} coefficient depending on a p-bit bit string of {0, 1} coefficient $b_{p-1}b_{p-2} \ldots b_1b_0$; and
    an arithmetic unit, wherein
    said arithmetic unit computes $g^s$ (modf(t)) using a value g of p bits stored in said generator storage unit, a value s of low order c bits of the p bits stored in said internal status storage unit, and a bit string of the p bits stored in said irreducible polynomial storage unit, an arithmetic result of the p bits of the arithmetic unit is stored in said internal status storage unit, low order o bits of the arithmetic result of the p bits are output, and a series of which processes are repeated a times, thereby generating a pseudo-random number.

2. A cryptographical pseudo-random number generation apparatus functioning as a calculation device for word length of w bits, comprising:
    an input unit inputting natural numbers c, o, and a (c+o≦p where p indicates a prime number, and $2^p-1$ also indicates a prime number) and three bit strings (on condition that each character string includes a bit of 0 and a bit of 1) of a bit length p;
    an internal status storage unit storing a first bit string of the bit length p input by said input unit;
    a generator storage unit storing a second bit string of the bit length p input by said input unit;
    an irreducible polynomial storage unit storing an irreducible polynomial f (t) ($=t^p+b_{p-1}t^{p-1}+b_{p-2}t^{p-2}+ \ldots +b_1t+b_0$) of a p-th {0, 1} coefficient depending on a p-bit bit string of {0, 1} coefficient $b_{p-1}b_{p-2} \ldots b_1b_0$; and
    a base point storage unit storing a third bit string of a bit length p input by said input unit; and
    an arithmetic unit, wherein
    said arithmetic unit computes $g^s$ (modf(t)) using a value g of p bits stored in said generator storage unit, a value x of the p bits stored in said base point storage unit, and a value s of low order c bits of the p bits stored in said internal status storage unit, an arithmetic result of the p bits is stored in said internal status storage unit, low order o bits of the p bits are output, and a series of which processes are repeated a times, thereby generating a pseudo-random number.

3. A cryptographical pseudo-random number generation apparatus functioning as a calculation device for word length of w bits, comprising:
    an input unit inputting natural numbers c, o, and a (c+o≦p where p indicates a prime number, and $2^p-1$ also indicates a prime number) and three bit strings (on condition that each character string includes a bit of 0 and a bit of 1) of a bit length p;
    an internal status storage unit storing a first bit string of the bit length p input by said input unit;
    a generator storage unit storing a second bit string of the bit length p input by said input unit;
    an irreducible polynomial storage unit storing an irreducible polynomial f (t) ($=t^p+b_{p-1}t^{p-1}+b_{p-2}t^{p-2}+ \ldots +b_1t+b_0$) of a p-th {0, 1} coefficient depending on a p-bit bit string of {0, 1} coefficient $b_{p-1}b_{p-2} \ldots b_1b_0$;
    a base point storage unit storing a third bit string of a bit length p input by said input unit;
    a multiple length adder unit; and
    an arithmetic unit, wherein
    said arithmetic unit computes $g^s$ (modf(t)) using a value g of p bits stored in said generator storage unit, a value x of the p bits stored in said base point storage unit, and a value s of low order c bits of the p bits stored in said internal status storage unit, an arithmetic result of the p bits is stored in said internal status storage unit, low order o bits of an calculation result of the p bits are output, said multiple length adder unit assumes the value x of the p bits stored in said base point storage unit as a multiple length, adds d to the value x, and stores the addition result in said base point storage unit, and a series of which processes are repeated a times, thereby generating a pseudo-random number.

4. A cryptographical pseudo-random number generation apparatus functioning as a calculation device for word length of w bits, comprising:
    an input unit inputting natural numbers $c_1,c_2, \ldots ,c_u,o_1,o_2, \ldots ,o_v$, a (u+v≦p (p indicates a prime number, and $2^p-1$ also indicates a prime number) and $c_i \leq p$, $o_i \leq p$, and $c_i \neq o_j$ for all i's) and a bit string of a bit length p (on condition that each bit string includes a bit of 0 and a bit of 1);
    an internal status storage unit storing the bit string of the bit length p input by said input unit; and
    an arithmetic unit performing arithmetic f including a logical operation and a shifting operation on the bit string of the bit length p stored in said internal status storage unit, wherein
    said arithmetic unit calculates $f^s$ (x) by performing the operation f on the value x of the bit string of the bit length p stored in the internal status storage unit for the number of times of the value s of the bit string prescribed by $c_1,c_2 \ldots ,c_u$ bits of the bit string of the bit length p stored in the internal status storage unit, stores the calculation result represented by p bits in the internal status storage unit, and outputs $o_1,o_2 \ldots ,o_v$ bits of the calculation result of the bit string of the p bits, and a series of which processes are repeated a times, thereby generating a pseudo-random number.

5. A cryptographical pseudo-random number generation apparatus functioning as a calculation device for word length of w bits, comprising:

an input unit inputting natural numbers $c_1, c_2, \ldots, c_u, o_1, o_2, \ldots, o_v$, a, d ($u+v \leq p$ (p indicates a prime number, and $2^p-1$ also indicates a prime number) and $c_i \leq p$, $o_i \leq p$, and $c_i \neq o_j$ for all i's) and a bit string of a bit length p (on condition that each bit string includes a bit of 0 and a bit of 1);

an internal status storage unit storing the bit string of the bit length p input by said input unit;

an arithmetic unit performing arithmetic f including a logical operation and a shifting operation on the bit string of the bit length p stored in said internal status storage unit; and a multiple length adder unit, wherein said arithmetic unit calculates $f^s(x)$ by performing the operation f on the value x of the bit string of the bit length p stored in the internal status storage unit for the number of times of value s of the bit string prescribed by $c_1, c_2 \ldots, c_u$ bits of the bit string of the bit length p stored in the internal status storage unit, stores the calculation result represented by p bits in the internal status storage unit, and outputs $o_1, o_2 \ldots, o_v$ bits of the calculation result of the bit string of the p bits, said multiple length adder unit adds the value x of the bit string of the p bits stored in said internal status storage unit to d(mod $2^p-1$), and stores the addition result in said internal status storage unit, and a series of which processes are repeated a times, thereby generating a pseudo-random number.

6. A cryptographical pseudo-random number generation apparatus functioning as a calculation device for word length of w bits, comprising:

an input unit inputting natural numbers $c_1, c_2, \ldots, c_u, o_1, o_2, \ldots, o_v$, a ($u+v \leq p$ (p indicates a prime number, and $2^p-1$ also indicates a prime number) and $c_i \leq p$, $o_i \leq p$, and $c_i \neq o_j$ for all i's) and a bit string of a bit length p (on condition that each bit string includes a bit of 0 and a bit of 1);

an internal status storage unit storing the bit string of the bit length p input by said input unit;

a first arithmetic unit performing an operation $f_1$ including a logical operation and a shifting operation; and a second arithmetic unit performing an operation $f_2$ including a logical operation and a shifting operation, wherein said first arithmetic unit calculates $f_1^s(x)$ by performing the operation $f_1$ on the value x of the bit string of the bit length p stored in the internal status storage unit for the number of times of the value s of the bit string prescribed by $c_1, c_2 \ldots, c_u$ bits of the bit string of the bit length p stored in the internal status storage unit, stores the calculation result represented by p bits in the internal status storage unit, and outputs $o_1, o_2 \ldots, o_v$ bits of the calculation result of the bit string of the p bits, said second arithmetic unit calculates $f_2^s(x')$ by performing the operation $f_2$ on the value x' of the bit string of the p bits stored in the internal status storage unit, and stores the calculation result of the p bits in said internal status storage unit, and a series of which processes are repeated a times, thereby generating a pseudo-random number.

7. A program executed by a computer for processing a word length of w bits, comprising the functions of:

inputting natural numbers c, o, and a ($c+o \leq p$ where p indicates a prime number, and $2^p-1$ also indicates a prime number) and two bit strings (on condition that each bit string includes a bit of 0 and a bit of 1) of a bit length p;

storing a first bit string of the input bit length p in an internal status storage unit;

storing a second bit string of the input bit length p in a generator storage unit;

storing an irreducible polynomial f (t) ($=t^p+b_{p-1}t^{p-1}+b_{p-2}t^{p-2}+ \ldots +b_1t+b_0$) of a p-th $\{0, 1\}$ coefficient depending on a p-bit bit string of $\{0, 1\}$ coefficient $b_{p-1}b_{p-2} \ldots b_1b_0$ in an irreducible polynomial storage unit; and computing $g^s$ (modf(t)) using a value g of p bits stored in said generator storage unit, a value s of low order c bits of the p bits stored in said internal status storage unit, and a bit string of the p bits stored in said irreducible polynomial storage unit, storing an arithmetic result of the p bits of the arithmetic unit in said internal status storage unit, outputting low order o bits of the arithmetic result of the p bits, and repeating a series of which processes a times, thereby generating a pseudo-random number.

8. A program executed by a computer for processing a word length of w bits, comprising the functions of:

inputting natural numbers c, o, and a ($c+o \leq p$ where p indicates a prime number, and $2^p-1$ also indicates a prime number) and three bit strings (on condition that each character string includes a bit of 0 and a bit of 1) of a bit length p;

storing a first bit string of the input bit length p in an internal status storage unit;

storing a second bit string of the input bit length p in a generator storage unit;

storing an irreducible polynomial f (t) ($=t^p+b_{p-1}t^{p-1}+b_{p-2}t^{p-2}+ \ldots +b_1t+b_0$) of a p-th $\{0, 1\}$ coefficient depending on a p-bit bit string of $\{0, 1\}$ coefficient $b_{p-1}b_{p-2} \ldots b_1b_0$ in an irreducible polynomial storage unit;

storing a third bit string of the input bit length p in a base point storage unit; and computing $g^s$ (modf(t)) using a value g of p bits stored in said generator storage unit, a value x of the p bits stored in said base point storage unit, and a value s of low order c bits of the p bits stored in said internal status storage unit, storing an arithmetic result of the p bits in said internal status storage unit, outputting low order o bits of the p bits, and repeating a series of which processes a times, thereby generating a pseudo-random number.

9. A program executed by a computer for processing a word length of w bits, comprising the functions of:

inputting natural numbers c, o, and a ($c+o \leq p$ where p indicates a prime number, and $2^p-1$ also indicates a prime number) and three bit strings (on condition that each character string includes a bit of 0 and a bit of 1) of a bit length p;

storing a first bit string of the input bit length pin an internal status storage unit;

storing a second bit string of the input bit length p in a generator storage unit;

storing an irreducible polynomial f (t) ($=t^p+b_{p-1}t^{p-1}+b_{p-2}t^{p-2}+ \ldots +b_1t+b_0$) of a p-th $\{0, 1\}$ coefficient depending on a p-bit bit string of $\{0, 1\}$ coefficient $b_{p-1}b_{p-2} \ldots b_1b_0$ in an irreducible polynomial storage unit;

storing a third bit string of the input bit length p in a base point storage unit; and computing $g^s$ (modf(t)) using a value g of p bits stored in said generator storage unit, a value x of the p bits stored in said base point storage unit, and a value s of low order c bits of the p bits stored in said internal status storage unit, storing an arithmetic result of the p bits in said internal status storage unit, outputting low order o bits of an calculation result of the p bits, assuming the value x of the p bits stored in said base point storage unit as a multiple length by a multiple length adder unit, adding d to the value x, storing the addition result in said base point storage unit, and repeating a series of which processes a times, thereby generating a pseudo-random number.

10. A program executed by a computer for processing a word length of w bits, comprising the functions of:
inputting natural numbers $c_1, c_2, \ldots c_u, o_1, o_2, \ldots o_v$, a (u+v≦p (p indicates a prime number, and $2^p-1$ also indicates a prime number) and $c_i \leq p$, $o_i \leq p$, and $c_i \neq o_j$ for all i's) and a bit string of a bit length p (on condition that each bit string includes a bit of 0 and a bit of 1);
storing the input bit string of the bit length p in an internal status storage unit; and
calculating $f^s$ (x) by performing the operation f including a logical operation and a shifting operation on the value x of the bit string of the bit length p stored in the internal status storage unit for the number of times of the value s of the bit string prescribed by $c_1, c_2, \ldots, c_u$ bits of the bit string of the bit length p stored in the internal status storage unit, storing the calculation result represented by p bits in the internal status storage unit, outputting $o_1, o_2, \ldots, o_v$ bits of the calculation result of the bit string of the p bits, and repeating a series of which processes a times, thereby generating a pseudo-random number.

11. A program executed by a computer for processing a word length of w bits, comprising the functions of:
inputting natural numbers $c_1, c_2, \ldots, c_u, o_1, o_2, \ldots, o_v$, a, d (u+v≦p (p indicates a prime number, and $2^p-1$ also indicates a prime number) and $c_i \leq p$, $o_i \leq p$, and $c_i \neq o_j$ for all i's) and a bit string of a bit length p (on condition that each bit string includes a bit of 0 and a bit of 1);
storing the bit string of the bit length p input by said input unit in an internal status storage unit;
performing arithmetic f including a logical operation and a shifting operation on the bit string of the bit length p stored in said internal status storage unit; and
performing a multiple length add, wherein
$f^s$ (x) is calculated by performing the operation f including a logical
operation and a shifting operation on the value x of the bit string of the bit length p stored in the internal status storage unit for the number of times of the value s of the bit string prescribed by $c_1, c_2, \ldots, c_u$ bits of the bit string of the bit length p stored in the internal status storage unit, the calculation result represented by p bits is stored in the internal status storage unit, $o_1, o_2, \ldots, o_v$ bits of the calculation result of the bit string of the p bits are output, said multiple length add adds the value x of the bit string of the p bits stored in said internal status storage unit to d(mod $2^p-1$), and stores the addition result in said internal status storage unit, and a series of which processes are repeated a times, thereby generating a pseudo-random number.

12. A program executed by a computer for processing a word length of w bits, comprising the functions of:
inputting natural numbers $c_1, c_2, \ldots, c_u, o_1, o_2, \ldots, o_v$, a (u+v≦p (p indicates a prime number, and $2^p-1$ also indicates a prime number) and $c_i \leq p$, $o_i \leq p$, and $c_i \neq o_j$ for all i's) and a bit string of a bit length p (on condition that each bit string includes a bit of 0 and a bit of 1);
storing the input bit string of the bit length p in an internal status storage unit;
performing a first operation $f_1$ including a logical operation and a shifting operation;
performing a second operation $f_2$ including a logical operation and a shifting operation;
calculating $f_1^s$ (x) by performing the first operation $f_1$ including a logical operation and a shifting operation on the value x of the bit string of the bit length p stored in the internal status storage unit for the number of times of the value s of the bit string prescribed by $c_1, c_2, \ldots, c_u$ bits of the bit string of the bit length p stored in the internal status storage unit, storing the calculation result represented by p bits in the internal status storage unit, outputting $o_1, o_2, \ldots, o_v$ bits of the calculation result of the bit string of the p bits, calculating $f_2^s$ (x') by performing the second operation $f_2$ including a logical operation and a shifting operation on the value x' of the bit string of the p bits stored in the internal status storage unit, storing the calculation result of the p bits in said internal status storage unit, and repeating a series of which processes a times, thereby generating a pseudo-random number.

13. A cryptographical pseudo-random number generation apparatus which functions as a calculation device for processing a word length of w, comprising:
a unit inputting natural numbers c, o, and a (where c+o≦p);
an input unit inputting a plurality of p-bit character strings (on condition that each bit string includes a bit of 0 and a bit of 1) in n and r defined as p=nw−r (where r<w) for a Mersenne prime number ($2^p-1$);
an internal status storage unit storing one of a plurality of p-bit input character strings;
a generator storage unit storing another p-bit input character string;
an irreducible polynomial storage unit storing an irreducible polynomial f(t) of a p-th {0, 1} coefficient;
an arithmetic unit comprising a polynomial multiplier and a remainder arithmetic unit calculating a remainder of a division using the irreducible polynomial f(t) stored in said irreducible polynomial storage unit when consecutive p bits $b_{p-1} b_{p-2} \ldots b_1 b_0$ are recognized as a polynomial $b_{p-1} t^{p-1} + b_{p-2} t^{p-2} + \ldots + b_1 t + b_0$; and
an output result unit outputting the arithmetic result, wherein
$g^s$ (mod f(t)) is calculated by said arithmetic unit using the value g of the p bits stored in said generator storage unit, and the value s of low order c bits of the p bits stored in said internal status storage unit, the calculation result is stored in said internal status storage unit, high order o bits of the p bits stored in said internal status storage unit are output, and a series of which processes are repeated a times, thereby generating a pseudo-random number.

14. The apparatus according to claim 13, further comprising
a base point storage unit storing another character string of the plurality of input p-bit character strings, wherein
$xg^s$ (mod f(t)) is calculated by said arithmetic unit using the value g of the p bits stored in said generator storage unit, the value x stored in said base point storage unit, and the value s of low order c bits of the p bits stored in said internal status storage unit, the calculation result is stored in said internal status storage unit, high order o bits of the p bits stored in said internal status storage unit are output, and a series of which processes are repeated a times, thereby generating a pseudo-random number.

15. The apparatus according to claim 13, further comprising:
a base point storage unit storing another character string of the plurality of input p-bit character strings, a unit inputting another natural number d, and a multiple length adder device, wherein $xg^s$ (mod f(t)) is calculated by said arithmetic unit using the value g of the p bits stored in said generator storage unit, the value x stored in said base point storage unit, and the value s of low order c bits of the p bits stored in said internal status storage unit, the calculation result is stored in said internal status storage unit, high order o bits of the p bits stored in said internal status storage unit are output, the value x stored in said base point storage unit is recognized as a multiple length value, adds the natural number d to the value x, and a series of which processes are repeated a times, thereby generating a pseudo-random number.

* * * * *

UNITED STATES PATENT AND TRADEMARK OFFICE
CERTIFICATE OF CORRECTION

PATENT NO.       : 7,257,224 B2                                       Page 1 of 1
APPLICATION NO.  : 10/610536
DATED            : August 14, 2007
INVENTOR(S)      : Takeshi Koshiba It is certified that error appears in the above-identified patent and that said Letters Patent is hereby corrected as shown below:

Column 17, Line 60, after "$b_1b_0$;" delete "and".

Column 21, Line 54, before "adds" delete "add".

Signed and Sealed this

Thirtieth Day of December, 2008

JON W. DUDAS
*Director of the United States Patent and Trademark Office*